US006812937B1

(12) United States Patent
Abbott et al.

(10) Patent No.: US 6,812,937 B1
(45) Date of Patent: Nov. 2, 2004

(54) SUPPLYING ENHANCED COMPUTER USER'S CONTEXT DATA

(75) Inventors: Kenneth H. Abbott, Kirkland, WA (US); Dan Newell, Medina, WA (US); James O. Robarts, Redmond, WA (US); Ken Swapp, Seattle, WA (US)

(73) Assignee: Tangis Corporation, Seattle, WA (US)

( * ) Notice: Subject to any disclaimer, the term of this patent is extended or adjusted under 35 U.S.C. 154(b) by 505 days.

(21) Appl. No.: 09/724,893

(22) Filed: Nov. 28, 2000

Related U.S. Application Data

(63) Continuation-in-part of application No. 09/464,659, filed on Dec. 15, 1999, now Pat. No. 6,513,046, and a continuation-in-part of application No. 09/216,193, filed on Dec. 18, 1998, now Pat. No. 6,466,232.
(60) Provisional application No. 60/194,001, filed on Apr. 2, 2000, and provisional application No. 60/193,999, filed on Apr. 2, 2000.

(51) Int. Cl.[7] .................................. G09G 5/00
(52) U.S. Cl. ............... 345/740; 345/734; 345/744; 709/213; 709/226; 709/217; 710/10; 710/102
(58) Field of Search ............... 345/700, 751, 345/866, 733–748; 710/10, 102; 709/213, 214, 215, 216, 217, 223, 226, 203, 204, 205, 206, 207

(56) References Cited

U.S. PATENT DOCUMENTS

| | | |
|---|---|---|
| 4,916,441 A | 4/1990 | Gombrich |
| 5,032,083 A | 7/1991 | Friedman |
| 5,201,034 A | 4/1993 | Matsuura et al. |
| 5,208,449 A | 5/1993 | Eastman et al. |
| 5,214,757 A | 5/1993 | Mauney et al. |
| 5,227,614 A | 7/1993 | Danielson et al. |
| 5,335,276 A | 8/1994 | Thompson et al. |
| 5,416,730 A | 5/1995 | Lookofsky |
| 5,470,233 A | 11/1995 | Fruchterman et al. |
| 5,493,692 A | 2/1996 | Theimer et al. |
| 5,544,321 A | 8/1996 | Theimer et al. |

(List continued on next page.)

FOREIGN PATENT DOCUMENTS

| | | |
|---|---|---|
| EP | 0823 813 A2 | 2/1998 |
| JP | 05260188 | 10/1993 |
| JP | 09091112 | 4/1997 |
| WO | WO 90/08361 | 7/1990 |
| WO | WO 97/03434 | 1/1997 |

OTHER PUBLICATIONS

Albrecht Schmidt et al, "There is more to Context than Location," Nov. 1998.*
Peter Mott & Stuart Robert, "A Formalism for Context Mediation Based on Feature Logic," Feb. 1998.*
U.S. patent application Ser. No. 09/724,777, Abbott et al., filed Nov. 28, 2000.

(List continued on next page.)

Primary Examiner—John Cabeca
Assistant Examiner—Tadesse Hailu
(74) Attorney, Agent, or Firm—Seed Intellectual Property Law Group PLLC

(57) ABSTRACT

Techniques are described for providing information about a current state that is modeled with multiple state attributes. In some situations, the providing of information includes receiving from first and second sources indications of ability to supply values for, respectively, an indicated one of the state attributes and another of the state attributes. In such situations, after receiving an indication of the indicated attribute from a first client, the providing of information further includes determining that the first source is available to supply a value for the indicated attribute, obtaining from the first source an indication of the value and information describing the indicated value, determining based at least in part on the descriptive information whether the indicated value is appropriate to be supplied to the client, and supplying the indicated value to the client when it is determined that the indicated value is appropriate.

80 Claims, 25 Drawing Sheets

U.S. PATENT DOCUMENTS

| | | |
|---|---|---|
| 5,555,376 A | 9/1996 | Theimer et al. |
| 5,559,520 A | 9/1996 | Barzegar et al. |
| 5,568,645 A | 10/1996 | Morris et al. |
| 5,601,435 A | 2/1997 | Quy |
| 5,603,054 A | 2/1997 | Theimer et al. |
| 5,611,050 A | 3/1997 | Theimer et al. |
| 5,642,303 A | 6/1997 | Small et al. |
| 5,646,629 A | 7/1997 | Loomis et al. |
| 5,719,744 A | 2/1998 | Jenkins et al. |
| 5,726,660 A | 3/1998 | Purdy et al. |
| 5,751,260 A | 5/1998 | Nappi et al. |
| 5,781,913 A | 7/1998 | Felsenstein et al. |
| 5,790,974 A | 8/1998 | Tognazzini |
| 5,798,733 A | 8/1998 | Ethridge |
| 5,812,865 A | 9/1998 | Theimer et al. |
| 5,873,070 A | 2/1999 | Bunte et al. |
| 5,878,274 A | 3/1999 | Kono et al. |
| 5,902,347 A | 5/1999 | Backman et al. |
| 5,910,799 A | 6/1999 | Carpenter et al. |
| 5,938,721 A | 8/1999 | Dussell et al. |
| 5,948,041 A | 9/1999 | Abo et al. |
| 5,959,611 A | 9/1999 | Smailagic et al. |
| 5,991,687 A | 11/1999 | Hale et al. |
| 6,014,638 A | 1/2000 | Burge et al. |
| 6,047,301 A | 4/2000 | Bjorklund et al. |
| 6,064,943 A | 5/2000 | Clark, Jr. et al. |
| 6,108,197 A | 8/2000 | Janik |
| 6,127,990 A | 10/2000 | Zwern |

OTHER PUBLICATIONS

U.S. patent application Ser. No. 09/724,799, Abbott et al., filed Nov. 28, 2000.

U.S. patent application Ser. No. 09/724,892, Abbott et al., filed Nov. 28, 2000.

U.S. patent application Ser. No. 09/724,894, Abbott et al., filed Nov. 28, 2000.

U.S. patent application Ser. No. 09/724,902, Abbott et al., filed Nov. 28, 2000.

U.S. patent application Ser. No. 09/724,932, Abbott et al., filed Nov. 28, 2000.

U.S. patent application Ser. No. 09/724,949, Abbott et al., filed Nov. 28, 2000.

"'Affective Understanding:' Modeling and Responding to User Affect," http://www.media.mit.edu/affect/AC_research/understanding.html, pp. 1–3 [Accessed Oct. 2, 1998].

"Alps GlidePoint," http://www.alps.com/p17.html, p. 1 [Accessed Oct. 2, 1998].

"GyroPoint Technology," http://www.gyration.com/html/gyropoint.html, pp. 1–3 [Accessed Oct. 2, 1998].

"Haptics," http://www.ai.mit.edu/projects/handarm–haptics/haptics.html, pp. 1–2 [Accessed Oct. 2, 1998].

"Research Areas in Affective Computing," http://www.media.mit.edu/affect/, p. 1 [Accessed Oct. 2, 1998].

"Research on Affective Pattern Recognition and Modeling," http://www.media.mit.edu/affect/AC_research/recognizing.html, pp. 1–4 [Accessed Oct. 2, 1998].

"Research on Sensing Human Affect," http://www.media.mit.edu/affect/AC_research/sensing.html, pp. 1–5 [Accessed Oct. 2, 1998].

"Smart Rooms," http://vismod.www.media.mit.edu/vismod/demos/smartroom/, pp. 1–3 [Accessed Oct. 2, 1998].

"SmartDesk Home Page," http://vismod.www.media.mit.edu/vismod/demos/smartdesk/, pp. 1–4 [Accessed Oct. 2, 1998].

"The MIT Wearable Computing Web Page," http://wearables.www.media.mit.edu/projects/wearables/, pp. 1–3 [Accessed Oct. 2, 1998].

"Wearable Computer Systems for Affective Computing," http://www.media.mit.edu/affect/AC_research/wearables.html, pp. 1–5 [Accessed Oct. 2, 1998].

Aoki, Hisashi et al., "Realtime Personal Positioning System for a Wearable Computer," $3^{rd}$ International Symposium on Wearable Computers, San Francisco, California, Oct. 18–19, 1999.

Bauer et al., "A Collaborative Wearable System with Remote Sensing," University of Oregon, Feb. 1996.

Billinghurst, Mark and Thad Starner, "New Ways to Manage Information," *IEEE,* pp. 57–64, Jan. 1999.

Bowskill, J. et al., "Wearable Location Mediated Telecommunications; A First Step Towards Contextual Communication," $3^{rd}$ International Symposium on Wearable Computers, San Francisco, California, Oct. 18–19, 1999.

Dey, Anind K. et al., "The Conference Assistant: Combining Context–Awareness with Wearable Computing," $3^{rd}$ International Symposium on Wearable Computers, San Francisco, California, Oct. 18–19, 1999.

Finger et al., "Rapid Design and Manufacture of Wearable Computers," Communication of the ACM, vol. 39, No. 2, Feb. 1996, pp. 63–68.

Golding, Andrew and Neal Lesh, "Indoor Navigation Using a Diverse Set of Cheap, Wearable Sensors," $3^{rd}$ International Symposium on Wearable Computers, San Francisco, California, Oct. 18–19, 1999.

Hull et al., "Towards Situated Computing," Hewlett–Packard Laboratories, HPL–97–66 (1997).

Kirsch, Dana, "The Sentic Mouse: A tool for measuring emotional valence," http://www.media.mit.edu/affect/AC_research/projects/sentic_mouse.html, pp. 1–2 [Accessed Oct. 2, 1998].

Kortuem et al., "Context–Aware, Adaptive Wearable Computers as Remote Interfaces to 'Intelligent' Environments," University of Oregon, Oct. 1998.

Kortuem, Gerd, "When Cyborgs Meet: Building Communities of Cooperating Wearable Agents," $3^{rd}$ International Symposium on Wearable Computers, San Francisco, California, Oct. 18–19, 1999.

Lashkari, Yezdi et al., "Collaborative Interface Agents," Proccedings of AAAI '94 Conference, Seattle, Washington, Aug. 1994.

Lehikoinen, Juha et al., "MEX: A Distributed Software Architecture for Wearable Computers," $3^{rd}$ International Symposium on Wearable Computers, San Francisco, California, Oct. 18–19, 1999.

Leonhardi, Alexander et al., Virtual Information Towers—A Metaphor for Intuitive, Location–Aware Information Access in a Mobile Environment, $3^{rd}$ International Symposium on Wearable Computers, San Francisco, California, Oct. 18–19, 1999.

Lunt, Teresa F. et al., "Knowledge–Based Intrusion Detection," Proceedings of the Annual Artificial Intelligence Systems in Government Conference, IEEE Comp. Soc. Press, vol. Conf. 4, 1989, pp. 102–107.

Maes, Pattie, "Agents That Reduce Work and Information Overload," Communications of the ACM, vol. 37, No. 7, Jul. 1994.

Mann, Steve, "'Smart Clothing': Wearable Multimedia Computing and 'Personal Imaging' to Restore the Technological Balance Between People and Their Environments", ACM Multimedia, Nov. 1996, pp. 163–174.

Metz, Cade, "MIT: Wearable PCs, Electronic Ink, and Smart Rooms," *PC Magazine*, pp. 192–193, Jun. 1998.

Oakes, Chris, "The Truman Show Realized?," http://www.wired.com/news/news/technology/story/15745.html, pp. 1–4 [Accessed Oct. 21, 1998].

Picard, R.W. and Healey, J., "Affective Wearables," Personal Technologies vol. 1: 231–240, MIT Media Laboratory (1997).

Rekimoto et al., "The World through the Computer: Computer Augmented Interaction with Real World Environments," ACM, Nov. 1995, pp. 29–36.

Rhodes, Bradley, "WIMP Interface Considered Fatal," http://rhodes.www.media.mit.edu/people/rhodes/Papers/no–wimp.html, pp. 1–3 [Accessed Oct. 2, 1998].

Rhodes, Bradley, J. "The Wearable Remembrance Agent: A System for Augmented Memory," Proceedings of the First International Symposium on Wearable Computers (ISWC '97), Cambridge, MA, Oct. 13–14, 1997.

Sato, J. et al., "Autonomous Behavior Control of Virtual Actors Based on the AIR Model," Proceedings Computer Animation, Jun. 5, 1997.

Schneider, Jay and Jim Suruda, "Modeling Wearable Negotiation in an Opportunistic Task Oriented Domain," $3^{rd}$ International Symposium on Wearable Computers, San Francisco, California, Oct. 18–19, 1999.

Smailagic et al., "Matching interface design with user task: Modalities of Interaction with CMU Wearable Computers," IEEE Personal Communications, Feb. 1996, pp. 14–25.

Smailagic, Asim et al., "MoCCA: A Mobile Communication and Computing Architecture," $3^{rd}$ International Symposium on Wearable Computers, San Francisco, California, Oct. 18–19, 1999.

Starner et al., "Visual Contextual Awareness in Wearable Computing," Media Lab, MIT, Oct. 1998.

Tan, Hong Z. and Alex Pentland, "Tactual Displays for Wearable Computing," *IEEE*, Massachusetts Institute of Technology Media Laboratory, pp. 84–88, 1997.

Yang, Jie et al., "Smart Sight: A Tourist Assistant System," $3^{rd}$ International Symposium on Wearable Computers, San Francisco, California, Oct. 18–19, 1999.

\* cited by examiner context server table 400

| context server name | version | installation date | filename | request handler |
|---|---|---|---|---|
| gps | 1 | 2/10/2000 | gps.exe | (reference) |
| ips | 1 | 2/21/2000 | ips.exe | (reference) |
| location_region_analysis | 1 | 2/10/2000 | l_r_a.exe | (reference) |

*Fig. 4* attribute instance table

| attribute name | context server name | value | uncertainty | timestamp | units | number of context clients consuming |
|---|---|---|---|---|---|---|
| user.location | gps | 47° 38.73' N, 122° 18.43' W | 0° .09' | 13:11:04.023 2/22/2000 | degrees/minutes | 2 |
| user.location | ips | 47° 38.745' N, 122° 18.424' W | 0° .021' | 13:11:01.118 2/22/2000 | degrees/minutes | 2 |
| user.elevation | ips | 22 | .5 | 13:11:01.118 2/22/2000 | meters | 1 |
| user.in_region | location_region_analysis | none | none | none | none | 0 |

| context client name | message handler |
|---|---|
| location_map | (reference) |
| distance_from_home | (reference) |
| region_analysis | (reference) |

600 — context client table
611 — (header row)
601 — location_map
602 — distance_from_home
603 — region_analysis
612 — message handler column

Fig. 7

| attribute name | context server name | value | uncertainty | timestamp | units | number of context clients consuming |
|---|---|---|---|---|---|---|
| user.location | gps | 47° 38.73' N, 122° 18.43' W | 0° .09' | 13:11:04.023 2/22/2000 | degrees/minutes | 2 |
| user.location | ips | 47° 38.745' N, 122° 18.424' W | 0° .021' | 13:11:01.118 2/22/2000 | degrees/minutes | 2 |
| user.elevation | ips | 22 | .5 | 13:11:01.118 2/22/2000 | meters | 1 |
| user.in_region | location_region_analysis | none | none | none | none | 1 |

700 — attribute instance table

Fig. 9 attribute instance table

| attribute name | context server name | value | uncertainty | timestamp | units | number of context clients consuming |
|---|---|---|---|---|---|---|
| user.location | gps | 47° 38.73' N, 122° 18.43' W | 0° .09' | 13:11:04.023 2/22/2000 | degrees/minutes | 2 |
| user.location | ips | 47° 38.745' N, 122° 18.424' W | 0° .021' | 13:11:01.118 2/22/2000 | degrees/minutes | 2 |
| user.elevation | ips | 22.25 | .5 | 13:11:06.565 2/22/2000 | meters | 1 |
| user.in_region | region_analysis | none | none | none | none | 1 |

Fig. 10 condition table

| condition name | context client name | first logical parameter | second logical parameter | comparison value | logical operator |
|---|---|---|---|---|---|
| in_region_true | region_analysis | user.in_region | none | TRUE | = | attribute request table

| attribute name | context client name |
|---|---|
| user.location | distance_from_home |
| user.in_region | location_map |
| user.location [gps] | location_region_analysis |
| user.elevation | location_map |

*Fig. 14*

User.
- Desired_privacy_level
- Interruptibility
- Speed
- Direction
- Acceleration
- Availability.
    - Cognitive_availability
    - Tactile_availability
    - Manual_availability
    - Visual_availability
    - Oral_availability
    - Auditory_availability
- Proximity.<Item or place name>
- Mood.
    - Happiness
    - Sadness
    - Anger
    - Frustration
    - Confusion
- Activity.
    - Driving
    - Eating
    - Running
    - Sleeping
    - Talking
    - Typing
    - Walking
- Location.
    - Place_name
    - Latitude
    - Longitude
    - Altitude
    - Room
    - Floor
    - Building
    - Address
    - Street
    - City
    - County
    - State
    - Country
    - Postal_Code
- Destination. (same as User.Location.)
- Physiology.
    - Pulse
    - Body_temperature
    - Blood_pressure
    - Respiration Person.<name or ID>. (same as User.)

Platform.
- UI.
    - Oral_input_device_availability
    - Manual_input_device_availability
    - Tactile_output_device_availability
    - Visual_output_device_availability
    - Auditory_output_device_availability Platform. (continued)
- CPU.
    - Load
    - Speed
- Memory.
    - Total_capacity
    - Used
- Storage.
    - Total_capacity
    - Used
- Connectivity.
    - Connection_status
    - Connection_speed
    - Connection_type/device
    - Connection_activity
- Power.
    - Power_source
    - Power_level Environment.
- People.
    - Nearest
    - Number_present
    - Number_close
- Local.
    - Time
    - Date
    - Temperature
    - Pressure
    - Wind_speed
    - Wind_direction
    - Absolute_humidity
    - High_forecast_temperature
    - Low_forecast_temperature
    - People_present
    - Ambient_noise_level
    - Ambient_light_level
    - Days.<previous or future>.
        - High_temperature
        - Low_temperature
        - Precipitation_type
        - Precipitation_amount
- Place.<place name>. (same as Environment.Local)

Application.
- Mail.
    - Available
    - New_messages_waiting
    - Messages_waiting_to_be_sent
- Phone.
    - Available
    - In_use
    - On/off
    - Notification_mechanism
    - Call_incoming
    - Caller_ID
- Sound_recorder.
    - Available
    - Recording

1) User Setting
   a) Mental Context
      i) Meaning
      ii) Cognition
         (1) Divided User Attention
         (2) Task Switching
         (3) Background Awareness
      iii) Solitude
      iv) Privacy
         (1) Desired Privacy
         (2) Perceived Privacy
      v) Social Context
      vi) Affect
   b) Physical Situation
      i) Body
         (1) Biometrics
         (2) Posture
         (3) Motion
         (4) Physical Encumberment
            (a) Senses
               (i) Eyes
               (ii) Ears
               (iii) Tactile
               (iv) Hands
               (v) Nose
               (vi) Tongue
            (b) Workload demands/effects
            (c) Interaction with computer devices
            (d) Interaction with people
            (e) Physical Health
      ii) Environment
         (1) Time/Space
         (2) Objects
         (3) Persons
            (a) Audience/Privacy Availability
               (i) Scope of Disclosure
               (ii) Hardware affinity for privacy
               (iii) Privacy Indicator for User
               (iv) Privacy Indicator for Public
               (v) Watching Indicator
               (vi) Being Observed Indicator
         (4) Ambient Interference
            (a) Visual
            (b) Audio
            (c) Tactile 2) Computer
   a) Power
   b) Configuration
      i) User Input Systems
         (1) Hand/Haptic
            (a) Keyboard/Keystrokes
         (2) Voice/Audio
         (3) Eye Tracking
         (4) Cursors
            (a) Axis
            (b) Resolution
               (i) Selection
               (ii) Invocation
            (c) Accelerators
      ii) Output Systems
         (1) Visual
            (a) Resolution
         (2) Audio
            (a) Public/Private
         (3) Haptic
      iii) External Resources
         (1) I/O devices
         (2) Connectivity
   c) Data
      i) Quantity/State
      ii) Urgency/Importance
         (1) Use of Prominence
      iii) Modality
      iv) Sensitivity/Purpose
         (1) Privacy Issues
         (2) Use of Association
         (3) Use of Safety
      v) Source/Ownership
         (1) Types
            (a) User generated
            (b) Other computers or people
            (c) Sensor
            (d) PC State
         (2) Use of Association

US 6,812,937 B1

SUPPLYING ENHANCED COMPUTER USER'S CONTEXT DATA

CROSS REFERENCE TO RELATED APPLICATIONS

This application is a continuation-in-part of U.S. patent application Ser. No. 09/216,193, now U.S. Pat. No. 6,466,232 entitled "METHOD AND SYSTEM FOR CONTROLLING PRESENTATION OF INFORMATION TO A USER BASED ON THE USER'S CONDITION" and filed Dec. 18, 1998, and a continuation-in-part of U.S. patent application Ser. No. 09/464,659, now U.S. Pat. No. 6,513,046 entitled "STORING AND RECALLING INFORMATION TO AUGMENT HUMAN MEMORIES" and filed Dec. 15, 1999. Both of these applications are hereby incorporated by reference in their entirety.

This application also claims the benefit of provisional U.S. Patent Application No. 60/194,001, entitled "SUPPLYING ENHANCED COMPUTER USER'S CONTEXT DATA" and filed Apr. 2, 2000, and of provisional U.S. Patent Application No. 60/193,999, entitled "OBTAINING AND USING CONTEXTUAL DATA FOR SELECTED TASKS OR SCENARIOS, SUCH AS FOR A WEARABLE PERSONAL COMPUTER" and filed Apr. 2, 2000. These applications are both hereby incorporated by reference in their entirety.

TECHNICAL FIELD

The following disclosure relates generally to computer-based modeling of information, and more particularly to modeling and exchanging context data, such as for a wearable personal computer.

BACKGROUND

Computer systems increasingly have access to a profusion of input information. For example, a computer may be able to receive instructions and other input from a user via a variety of input devices, such as a keyboard, various pointing devices, or an audio microphone. A computer may also be able to receive information about its surroundings using a variety of sensors, such as temperature sensors. In addition, computers can also receive information and communicate with other devices using various types of network connections and communication schemes (e.g., wire-based, infrared or radio communication).

Wearable personal computers (or "wearables") can have even greater access to current input information. Wearables are devices that commonly serve as electronic companions and intelligent assistants to their users, and are typically strapped to their users' bodies or carried by their user in a holster. Like other computers, wearables may have access to a wide variety of input devices. Moreover, in addition to more conventional input devices, a wearable may have a variety of other input devices such as chording keyboards or a digitizer tablet. Similarly, a wearable computer may have access to a wide variety of sensors, such as barometric pressure sensors, global positioning system devices, or a heart rate monitor for determining the heart rate of its user. Wearables also may have access to a wide variety of non-conventional output devices, such as display eyeglasses and tactile output devices.

Many applications executing on computers utilize data received by the computer from sensors or other input sources. For example, a position mapping application for a wearable computer may utilize data received from a global positioning system device in order to plot its user's physical location and to determine whether that position is within a specified region. In this example, the global positioning system device produces data that is consumed by the position mapping application.

In conventional wearable computer systems, the position mapping application would be designed to interact directly with the global positioning system device sensor to obtain the needed data. For example, the application may be required to instruct the device to obtain position information, retrieve the information obtained by the device, convert it to conventional latitude and longitude representation, and determine whether the represented location is within the special region.

The need for such direct interaction between applications and sensors in order to obtain and process data has several significant disadvantages. First, developing an application to interact directly with a particular sensor can introduce sensor-specific dependencies into the application. Accordingly, the application may need to be subsequently modified to be able to interact successfully with alternatives to that sensor provided by other manufacturers, or even to interact successfully with future versions of the same sensor. Alternately, the sensor could be developed to explicitly support a particular type of application (e.g., via a device driver provided with the sensor), which would analogously introduce application-specific dependencies into the sensor.

Second, direct interaction between the application and the sensor can give rise to conflicts between multiple applications that consume the same data. For example, if the position mapping application was executing on the same wearable computer as a second application for determining the user's distance from home, and the second application also used the global positioning system device, the two applications' interactions with the device could interfere with one another.

Third, direct interaction between the application and the sensor can give rise to conflicts between multiple sensors that produce the same data. For example, if the position mapping application was executing on a wearable computer that had access to both the global positioning system device and an indoor positioning system, the application might well have trouble determining which device to use to determine the user's current position, and/or have trouble reconciling data produced by both devices.

Fourth, rather than an application having to directly process observable data from the sensors and derive more abstract information itself, it would be advantageous for the application to be able to rely on a separate programmatic entity that derives such abstract information and provides it to the application. For example, it would be more convenient for the position mapping application to be able rely on a separate programmatic entity that determines the user's location, and to then use that information to determine whether the user is in a special region.

Accordingly, a facility for exchanging information between sensors and applications in a wearable computer system would have significant utility.

BRIEF DESCRIPTION OF THE DRAWINGS

FIG. 4 is a data structure diagram showing an example context server table used to maintain a portion of the state of the characterization module.

FIG. 5 is a data structure diagram showing an example attribute instance table used to maintain a portion of the state of the characterization module.

FIG. 6 is a data structure diagram showing an example context client table used to maintain a portion of the state of the characterization module.

FIG. 7 is a data structure diagram showing updated contents of the attribute instance table.

FIG. 9 is a data structure diagram showing updated contents of the attribute instance table.

FIG. 10 is a data structure diagram showing an example condition table that contains a portion of the state of the characterization module.

FIG. 14 is a data structure diagram showing an example attribute request table used to maintain a portion of the state of the characterization module.

FIG. 15 illustrates an example of a plain-language, hierarchical, taxonometric attribute nomenclature.

FIG. 16 illustrates an example of an alternate hierarchical taxonomy related to context.

DETAILED DESCRIPTION

Figure 1:
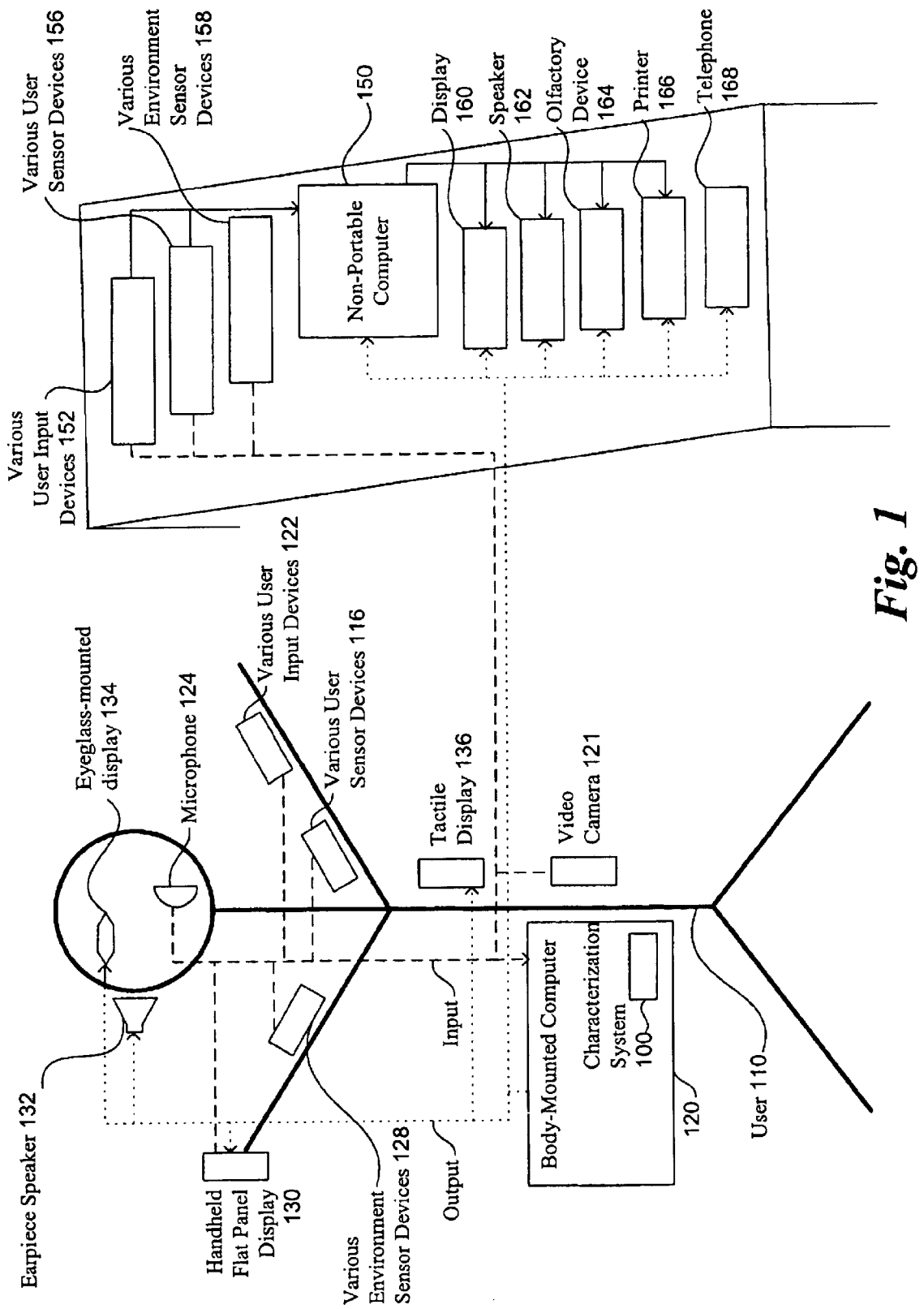
FIG. 1 illustrates an embodiment of the characterization module executing on a general-purpose body-mounted wearable computer.

A software facility is described below that exchanges information between sources of context data and consumers of context data. In particular, in a preferred embodiment, a characterization module operating in a wearable computer system receives context information from one or more context servers (or "suppliers"), and provides that information to one or more context clients (or "consumers"). This context information represents a particular context (or "state" or "condition") of the wearable, the user of the wearable, the surrounding physical environment and/or the available electronic data environment (or "cyber-environment"). In some embodiments the context is represented (or "modeled") with a variety of attributes (or "variables") each modeling a single aspect of the context. By facilitating the exchange of context information, the facility reduces dependencies of context client applications on specific sensors and other input sources, resolves conflicts between context client applications that consume the same context data, resolves conflicts between multiple sensors or other input sources that produce the same data, and isolates the generation of derived attributes from context client applications.

A context is modeled or represented with multiple attributes that each correspond to a specific element of the context (e.g., ambient temperature, location or a current user activity), and the value of an attribute represents a specific measure of that element. Thus, for example, for an attribute that represents the temperature of the surrounding air, an 80° Fahrenheit value represents a specific measurement of that temperature. Each attribute preferably has the following properties: a name, a value, an uncertainty level, units, and a timestamp. Thus, for example, the name of the air temperature attribute may be "ambient-temperature," its units may be degrees Fahrenheit, and its value at a particular time may by 80. Associated with the current value may be a timestamp of Feb. 27, 1999 13:07 PST that indicates when the value was generated, and an uncertainty level of +/−1 degrees.

Context servers supply values for attributes by receiving and processing input information from sensors or other sources. Attribute values provided by a context server may either be "measured" (or "observed") in that they are directly received from an input source, or may instead be "derived" in that they are the result of performing processing on one or more measured attribute values. Indeed, a derived attribute value may be produced by performing additional processing on one or more other derived attribute values. Context attributes (or "condition variables") are discussed in greater detail in both U.S. patent application Ser. No. 09/216,193, filed Dec. 18, 1998 and entitled "METHOD AND SYSTEM FOR CONTROLLING PRESENTATION OF INFORMATION TO A USER BASED ON THE USER'S CONDITION", and provisional U.S. Patent application No. 60/193,999 filed Apr. 2, 2000 and entitled "OBTAINING AND USING CONTEXTUAL DATA FOR SELECTED TASKS OR SCENARIOS, SUCH AS FOR A WEARABLE PERSONAL COMPUTER," which are both hereby incorporated by reference.

When the characterization module obtains an attribute value from a context server, it caches the value for use when responding to future requests from context clients for a value of the attribute. Thus, when the characterization module receives a request from a context client for the value of an attribute, the characterization module determines whether it has a cached value for the attribute and, if so, whether the value is sufficiently accurate (e.g., the value does not have too high of an uncertainty) and/or sufficiently recent (e.g., the value is not too old). If the value is not sufficiently accurate or recent, the characterization module requests and receives an updated value for the attribute from the context server that supplied the value. When the characterization module has a sufficiently accurate and recent value, it supplies the value to the context client. The determination of whether a value is sufficiently accurate and recent can be made in a variety of ways, such as by using thresholds for recency or uncertainty that can be specified by the context client during the request, by a context server for all values of an attribute or for a specific attribute value, or by the characterization module.

In some embodiments, two or more different context servers may supply to the characterization module their own distinct values for a single attribute. For example, a first context server can supply a value for a user.location attribute based on data received from a global positioning system device, while a second context server can supply a value for the user.location attribute based on data received from an indoor positioning device. Alternately, the first and second context servers could use the same input information when determining the value for a single attribute, but could use different methods to perform the determining and could thus arrive at different values. When multiple content servers supply values for the same attribute, each of the context servers is said to supply values for a separate "instance" of the attribute. The characterization module preferably provides a variety of different approaches, called "mediators," for determining what attribute value to provide when a context client requests a value for an attribute that has more than one instance.

For attributes with multiple instances, the characterization module performs similar processing to that described above. In particular, the characterization module can maintain a unique cached value for each attribute instance. If the characterization module receives a request for a value of a particular attribute instance, the request is handled as discussed above. If the characterization module instead receives a attribute value request for an attribute with multiple instances and the request does not specify a particular instance, the characterization module checks the accuracy of each cached attribute instance and requests an updated value for any instance with a value that is not sufficiently accurate. If multiple sufficiently accurate values are available, the characterization module produces a mediated value that is returned to the context client. The mediator to be used for the mediation can be selected in a variety of ways, such as being a default mediator of the characterization module, being requested by a context client, being specified by one or more of the context servers, or being chosen by the characterization module.

The manner in which data (e.g., sensor data and attribute values),flows to and from the characterization module can vary. In some embodiments, a context client may receive an attribute value only after an explicit request, while in other embodiments a context client may be forwarded attribute values without a request (e.g., if the client had previously expressed an interest in receiving values for the attribute and a value has just become available). Similarly, in some embodiments context servers may supply attribute values only when requested, while in other embodiments the context servers may supply attribute values without a request (e.g, if sensor input information is received from which a new value is produced). Request-based processing is a type of "pull" data flow model, and some forms of processing that occur without explicit requests are referred to as a "push" or "event-driven" data flow model.

The manner in which the characterization module communicates with the context clients and context servers can also vary. In some embodiments, context servers and context clients perform various interactions with the characterization module (e.g., supplying attribute values and requests) by calling functions provided by the characterization module (e.g., via Component Object Module interfaces). These functions are said to collectively comprise an "application programming interface" (or "API") to the characterization module. In alternate embodiments, such interactions can be performed using other mechanisms, such as passing messages or objects. Those skilled in the art will appreciate that an API can be created to support a pull data model, a push data model, or a hybrid system including both push and pull functionality.

As one example of an API, each executing context server may register with the characterization module by calling a RegisterContextServer function and supplying parameters to identify itself. If a particular context server is not executing, a context client that desires a value of an attribute or attribute instance supplied by the context server may cause the context server to be launched by using a LaunchContextServer function. After registration, a context server may indicate an ability to supply values for an attribute to the characterization module by using a CreateAttributeInstance function. A particular context server can provide values for a number of different attributes by calling the CreateAttributeInstance function multiple times. In order to consume values of an attribute, a context client may call a RegisterContextClient function in order to identify itself and one or more attributes whose values it seeks to consume. To assist in selecting one or more attributes, a context client may also call a EnumerateAttributes function to obtain a list of the attributes available from the characterization module. In order to actually retrieve an attribute value, a context client may call a GetAttribute function and use parameters to identify the attribute and any attribute processing that should be applied, such as a specific mediator to be used if values are available for multiple instances of the attribute. For attributes that have multiple instances in the characterization module, a context client may also call a GetAllAttributeInstances function to obtain a value for each instance of the attribute. To force a particular context server to reevaluate all of its attribute instances, a context client may call a CompleteContextServerEvaluation function. Also, to retrieve values for attributes that model aspects of the configuration of the characterization module, a context client or other program may call a GetCharacterizationModuleAttribute function. A context client that consumes a particular attribute value may also create a condition in the characterization module (not to be confused with the current modeled condition of the user or the environment that is represented by various attribute values) for testing that attribute by calling a CreateCondition function. Once a context client has created a condition, it can evaluate the condition by calling an EvaluateCondition function using parameters to identify the condition, and may also proceed to create a condition monitor that monitors the condition and notifies the context server when the condition is satisfied by calling a CreateConditionMonitor function. To suspend operation of a created condition monitor, a context server may call a StopConditionMonitor function, and to resume its operation, may call a StartConditionMonitor function. The context server may remove a condition monitor that it created by calling a RemoveConditionMonitor function and, correspondingly, may remove a condition that it created by calling a RemoveCondition function. A context client may unregister with the characterization module by calling an UnregisterContextClient function. A context server may similarly remove attribute instances that it has registered by calling a RemoveAttributeInstance function. Before it does, however, it may first call a CheckAttributeInstanceDependencies function to determine whether any context clients currently depend upon that attribute instance. A context server may unregister with the characterization module by calling an UnregisterContextServer function. A set of API functions are discussed in greater detail in both U.S. patent application Ser. No. 09/541,328, filed Apr. 2, 2000 and entitled "INTERFACE FOR EXCHANGING CONTEXT DATA," and provisional U.S. Patent Application No. 60/194,123, filed Apr. 2, 2000 and entitled "SUPPLYING AND CONSUMING USER CONTEXT DATA," which are both hereby incorporated by reference.

In some embodiments, it may also be useful to store attribute value information in a more permanent fashion than a temporary cache. For example, it may be useful for the characterization module to keep a log of all attribute values received and sent, or of all interactions with context clients and context servers. Alternately, it may be useful to record the current values of some or all of the attributes and attribute instances at the same time, such as to capture a complete model of the current context. Storing attribute value information is discussed in greater detail in both U.S. patent application Ser. No. 09/464,659, filed Dec. 15, 1999 and entitled "STORING AND RECALLING INFORMATION TO AUGMENT HUMAN MEMORIES", and U.S. patent application Ser. No. 09/541,326, filed Apr. 2, 2000 and entitled "LOGGING AND ANALYZING COMPUTER USER'S DATA," which are both hereby incorporated by reference. Other uses of attribute value information are described in provisional U.S. Patent Application No. 60/194, 000, filed Apr. 2, 2000 and entitled "SOLICITING PRODUCT INFORMATION BASED ON THE USER'S CONTEXT," in provisional U.S. Patent Application No. 60/194,002, filed Apr. 2, 2000 and entitled "AUTOMATED SELECTION OF UNSOLICITED INFORMATION BASED ON A USER'S CONTEXT," and in provisional U.S. Patent Application No. 60/194,758, filed Apr. 2, 2000 and entitled "CREATING PORTALS BASED ON THE USER'S CONTEXT," each of which are hereby incorporated by reference.

FIG. 1 illustrates an embodiment of the characterization module which executes on a general-purpose body-mounted wearable computer 120 worn by user 110. Many wearable computers are designed to act as constant companions and intelligent assistants to a user, and are often strapped to a user's body or mounted in a holster. The computer system may also be incorporated in the user's clothing, be implanted in the user, follow the user, or otherwise remain in the user's presence. In one preferred embodiment the user is human, but in additional preferred embodiments, the user may be an animal, a robot, a car, a bus, or another entity whose context is to be modeled. Indeed, the computer system may have no identifiable user, but rather operate as an independent probe, modeling and/or reporting on the context in an arbitrary location.

The wearable computer 120 has a variety of user-worn user input devices including a microphone 124, a hand-held flat panel display 130 with character recognition capabilities, and various other user input devices 122. Similarly, the computer has a variety of user-worn output devices that include the hand-held flat panel display, an earpiece speaker 132, an eyeglass-mounted display 134, and a tactile display 136. In addition to the various user-worn user input devices, the computer can also receive information from various user sensor input devices 116 and from environment sensor input devices 128, including video camera 121. The characterization module can receive and process the various input information received by the computer, either directly or from context servers that process the input information and generate attribute values, and can supply the received information to context clients or directly to the user by presenting the information on the various output devices accessible to the computer.

In the current environment, computer 120 is accessible to a computer 150 (e.g., by being in line-of-sight wireless proximity or by being reachable via a long-distance communication device such as a cellular phone) which also has a variety of input and output devices. In the illustrated embodiment the computer 150 is non-portable, although the body-mounted computer of the user can similarly communicate with a variety of other types of computers, including body-mounted computers of other users. The devices from which the non-portable computer can directly receive information include various user input devices 152 and various user sensor input devices 156. The non-portable computer can output information directly to a display 160, a speaker 162, an olfactory device 164, and a printer 166. In the illustrated embodiment, the body-mounted computer can communicate with the non-portable computer via a wireless transmission medium. In this manner, the characterization module can receive information from the user input devices 152 and the user sensor devices 156 after the information has been transmitted to the non-portable computer and then to the body-mounted computer. Alternately, the body-mounted computer may be able to directly communicate with the user input devices 152 and the user sensor devices 156, as well as with other various remote environment sensor input devices 158, without the intervention of the non-portable computer 150. Similarly, the body-mounted computer may be able to supply output information to the display 160, the speaker 162, the olfactory device 164, and the printer 166, either directly or via the non-portable computer, and directly to the telephone 168. As the user moves out of range of the remote input and output devices, attribute values of the characterization module can be updated to reflect that the remote devices are not currently available.

Information that is received from the various input devices allows the characterization module or an application such as a context server (not shown) executing on the computer 120 to monitor the user and the environment, and to maintain a model (not shown) of the current context. In some embodiments, the model may be represented in a single location (e.g., the current cached values of all of the context attributes and attribute instances), while in other embodiments the model may be distributed. Such a model can be used by various applications, such as context clients, for a variety of purposes. A model of the current context can include a variety of context attributes that represent information about the user, the computer, and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g, jogging or talking on a phone), emotional state (e.g., angry or puzzled), desired output behavior for different types of information (e.g, to present private family information so that it is perceivable only to myself and my family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, user mood, and locations. The model of the current context can include information added explicitly from other sources (e.g., application programs), as well as user-specified or system-learned defaults and preference information.

Those skilled in the art will appreciate that computer systems 120 and 150, as well as their various input and output devices, are merely illustrative and are not intended to limit the scope of the present invention. The computer systems may contain additional components or may lack some illustrated components. For example, the characterization module could be implemented on the non-portable computer, with the body-mounted computer replaced by a thin computer client such as a transmitter/receiver for relaying information between the body-mounted input and output devices and the non-portable computer. Alternately, the user may not wear any devices or computers.

In addition, the body-mounted computer may be connected to one or more networks of other devices through wired or wireless communication means (e.g., wireless RF, a cellular phone or modem, infrared, physical cable, a docking station, etc.), either with or without support from other computers such as the computer 150. For example, the body-mounted computer of a user can make use of output devices in a smart room, such as a television and stereo when the user is at home, if the body-mounted computer is able to transmit information to those devices via a wireless medium or if a cabled or docking mechanism is available. Alternately, kiosks or other information devices can be installed at various locations (e.g., in airports or at tourist spots) to transmit relevant information to body-mounted computers within the range of the information device. Those skilled in the art will also appreciate that specialized versions of the body-mounted computer, characterization module, context clients and/or context servers can be created for a variety of purposes.

Figure 2:
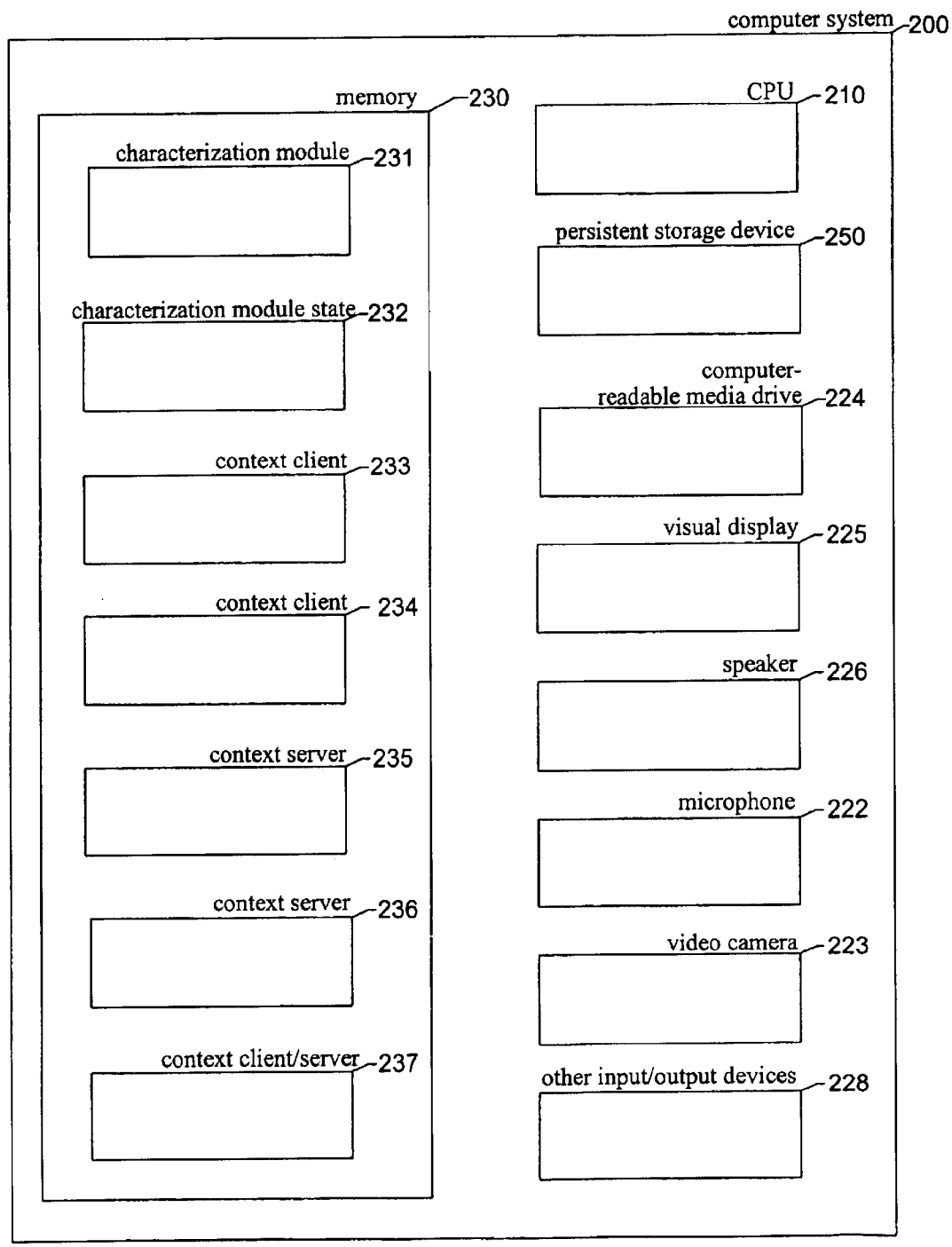
FIG. 2 is a block diagram illustrating an embodiment of the characterization module executing on an exemplary computer system.

FIG. 2 illustrates an exemplary computer system 200 on which an embodiment of the characterization module is executing. The computer includes a memory 230, a CPU 210, a persistent storage device 250 such as a hard drive, and input/output devices including a microphone 222, a video camera 223, a computer-readable media drive 224 (e.g., a CD-ROM drive), a visual display 225, a speaker 226, and other devices 228. The memory preferably includes the characterization module 231, as well as information reflecting the current state of the characterization module (characterization module state) 232. The memory further contains software modules 233, 234, and 237 that consume attribute values and are therefore context clients, and software modules 235, 236, and 237 which provide attribute values and are therefore context servers. While items 231–237 are preferably stored in memory while being used, those skilled in the art will appreciate that these items, or portions of them, can be transferred between memory and the persistent storage device for purposes of memory management and data integrity. Alternately, in other embodiments some or all of the software modules may execute in memory on another device, and communicate with the characterization module via inter-computer communication.

In addition, in some embodiments a pre-defined set of attributes are available for use by context servers and context clients. This allows a common meaning to be shared between context clients and context servers as to those attributes and their values, and can also allow a context client to request a pre-defined attribute without having to determine whether the attribute has been created by a context server supplying values for the attribute. In one embodiment a plain-language, hierarchical, taxonometric attribute nomenclature is used to name attributes, such as the example attribute nomenclature illustrated in FIG. 15. The names within the nomenclature are preferably specific so that there is no ambiguity as to what they represent, and the ability to extend the nomenclature by adding new attribute names that conform to the hierarchical taxonomy of the nomenclature is preferably supported. The nomenclature preferably has attribute names relating to a variety of aspects of the user.

For example, as is illustrated in FIG. 15, the nomenclature preferably has a variety of types of attribute names, including: attribute names relating to the user's location, such as user.location.latitude, user.location.building, and user.location.street; attribute names relating to the user's movement, such as user.speed and user.direction; attribute names for various user moods, such as user.mood.happiness, user.mood.anger, and user.mood.confusion; attribute names for user activities, such as user.activity.driving, user.activity.eating, and user.activity.sleeping; attribute names for user physiology values, such as user.physiology.body_temperature and user.physiology.blood_pressure; attribute names for similar attributes of people other than the user, such as person.John_Smith.mood.happiness; attribute names for aspects of the computer system or "platform," such as for aspects of the platform's user interface ("UI") capabilities (e.g., platform.UI.oral_input_device_availability and platform.UI.visual_output_device_availability) and central processing unit ("CPU") (e.g., platform.cpu.load and platform.cpu.speed); attribute names for aspects of the local environment, such as environment.local.temperature and environment.local.ambient_noise_level; attribute names for remote environments, such as environment.place.chicago.time and environment.place.san_diego.temperature; attribute names relating to a future context, such as those that predict or estimate a situation (e.g., environment.local.next_week.temperature); attribute names relating to specific applications, such as an email application (e.g., application.mail.available, application.mail.new_messages_waiting, and application.mail.messages_waiting_to_be_sent); etc. In this manner, the attribute nomenclature used by the facility provides effective names for attributes relating to the user, the computer system, and the environment. Additional attributes are illustrated in FIG. 15, and FIG. 16 illustrates an alternate hierarchical taxonomy related to context, such that various attributes could be added for each of the illustrated categories. Those skilled in the art will appreciate that for both FIG. 15 and FIG. 16, other categories and attributes could be added and existing categories and attributes could be removed or could have alternate names.

Figure 3:
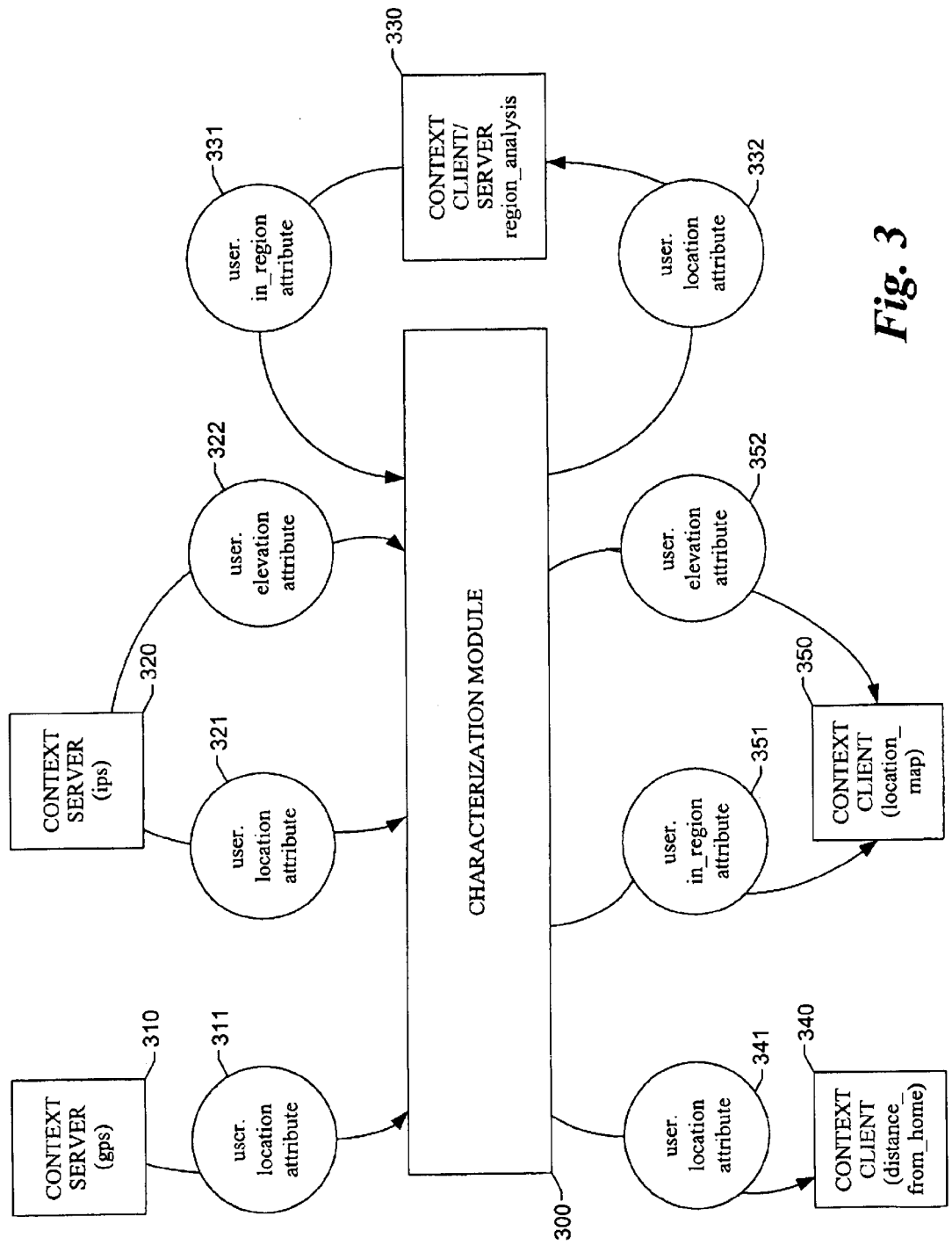
FIG. 3 is a data flow diagram showing a sample exchange of attributes performed by the characterization module.

FIG. 3 is a data flow diagram showing a sample exchange of attributes performed by the characterization module. The diagram shows characterization module 300, as well as five other software modules, 310, 320, 330, 340, and 350. Software modules 310, 320, and 330 are said to be context servers, in that they provide attribute values to the characterization module. For example, context server 330 provides values for a user.in_region attribute 331. It can be seen that context servers may provide values for more than one attribute. For example, context server 320 provides values for a user.location attribute 321 and an user.elevation attribute 322. It can further be seen that values for a single attribute may be provided by more than one context server. For example, context server 310 provides values for user-.location attribute 311, while context server 320 provides values for user.location attribute 321. Attributes 311 and 321 will be represented by the characterization module as multiple instances of a single user.location attribute. The characterization module preferably provides functionality for mediating between these two separate instances when the value of the user.location attribute is requested by a context client.

Software modules 330, 340, and 350 are said to be context clients because they consume attribute values. For example, context client 340 consumes user.location attribute 341 values. It can be seen that certain software modules may act both as a context server and as a context client. For example, software module 330 is both a context server and a context client, as it provides values for the user.in_region attribute 331 and consumes values for user.location attribute 332. It can also be seen that a context client can consume values for more than one attribute. For example, context client 350 consumes values for both user.in_region attribute 351 and user.elevation attribute 352. To determine which attributes are currently available, any of the context clients may request that the characterization module enumerate the available attributes. In response to such a request, the characterization module would enumerate the user.location attribute, the user.elevation attribute, and the user.in_region attribute.

FIG. 4 is a data structure diagram showing an example context server table used to maintain a portion of the state of the characterization module. Each row of the table corresponds to a registered context server. Each row contains a context server name field 411 containing the name of the context server, a version field 412 identifying the version of the context server, an installation date 413 identifying the date on which the context server was installed on the computer system, a filename 414 identifying a primary file in the file system representing the context server, and a request handler field 415 containing a reference to a request handler function on the context server that may be called by the characterization module to send messages to the context server (e.g., a request evaluation of one or all of the attributes provided by the context server). Other versions of the context server table may lack some of the illustrated fields (e.g., the version field), or may contain additional fields (e.g., a registered attributes field that contains the names of all of the attributes for which the context server is currently registered to supply values).

FIG. 5 is a data structure diagram showing an example attribute instance table used to maintain a portion of the state of the characterization module. The attribute instance table contains a row for each attribute or attribute instance for which a context server is currently registered to supply values. Each of these rows contains the following fields: an attribute name field 511 containing the name of the attribute, a context server name field 512 identifying the context server that created the attribute instance, a value field 513 containing the value of the attribute last provided by the context server, and uncertainty field 514 identifying the level of uncertainty of the value, a timestamp 515 indicating the time at which the value is effective, a units field 516 identifying the units for the value and the uncertainty, and an indication 517 of the number of context clients consuming values for the attribute instance. While row 501 indicates that an instance of the user.location attribute from the gps context server has a multi-part value of 47° 36.73' N and 122° 18.43' W degrees and minutes, in alternate embodiments multi-part values may not be used, such as instead having two attributes to represent this context element (e.g., user.location.latitude and user.location.longitude). Similarly, while field 517 indicates the number of context clients consuming values for an attribute, in alternate embodiments this number could be dynamically calculated rather than being stored (e.g., by using the attribute request table discussed below), or an identifier for each context client could instead be stored rather than merely a number. Other versions of the attribute instance table may lack some of the illustrated fields, such as the units field if all the instances of an attribute are restricted to having the same units and if such common information about all the attribute instances is stored elsewhere. Alternately, some versions of the attribute instance table could include additional information, such as a separate row for each attribute with multiple instances that contains common information about all of instances, and additional fields such as a context client field that contains the name of each context client registered to receive values for the attribute or instance of that row. Other versions of the attribute instance table could include other additional fields such as an optional specified context client field so that the context server can indicate one or more context clients that are able to receive values for the attribute (e.g., a list of authorized clients).

FIG. 6 is a data structure diagram showing an example context client table used to maintain a portion of the state of the characterization module. Each row corresponds to a registered context client, and contains a context client name field 611 identifying the name of the registered context client as well as a message handler field 612 containing the reference to a message handler provided by the context client for processing messages from the characterization module. Other versions of the context client table may lack some of the illustrated fields, or may contain additional fields (e.g., a registered attributes field that contains the names of all of the attributes for which the context server is currently registered to receive values).

FIG. 7 is a data structure diagram showing updated contents of the attribute instance table illustrated in FIG. 5. It can be seen that, in response to registration of a location_ map context client consuming values for the user.in_region attribute, the characterization module has incremented the number of context clients consuming the user.in_region attribute from 0 to 1.

FIG. 14 is a data structure diagram showing an example attribute request table used to maintain a portion of the state of the characterization module. The attribute request table contains a row for each attribute for which a context client is currently registered to receive values. Each of these rows contains the following fields: an attribute name field 1411 containing the name of the attribute, and a context client name field 1412 identifying the context client that registered a request to receive values for the attribute. Note that a context client can request values for an attribute without specifying a particular instance, as in row 1401, or can instead request values for a specific attribute instance, as in row 1403. Other versions of the attribute request table may lack some of the illustrated fields, or may contain additional fields such as an optional field to specify one or more particular context servers that can supply the values for the attribute (e.g., a list of authorized context servers).

Figure 8:
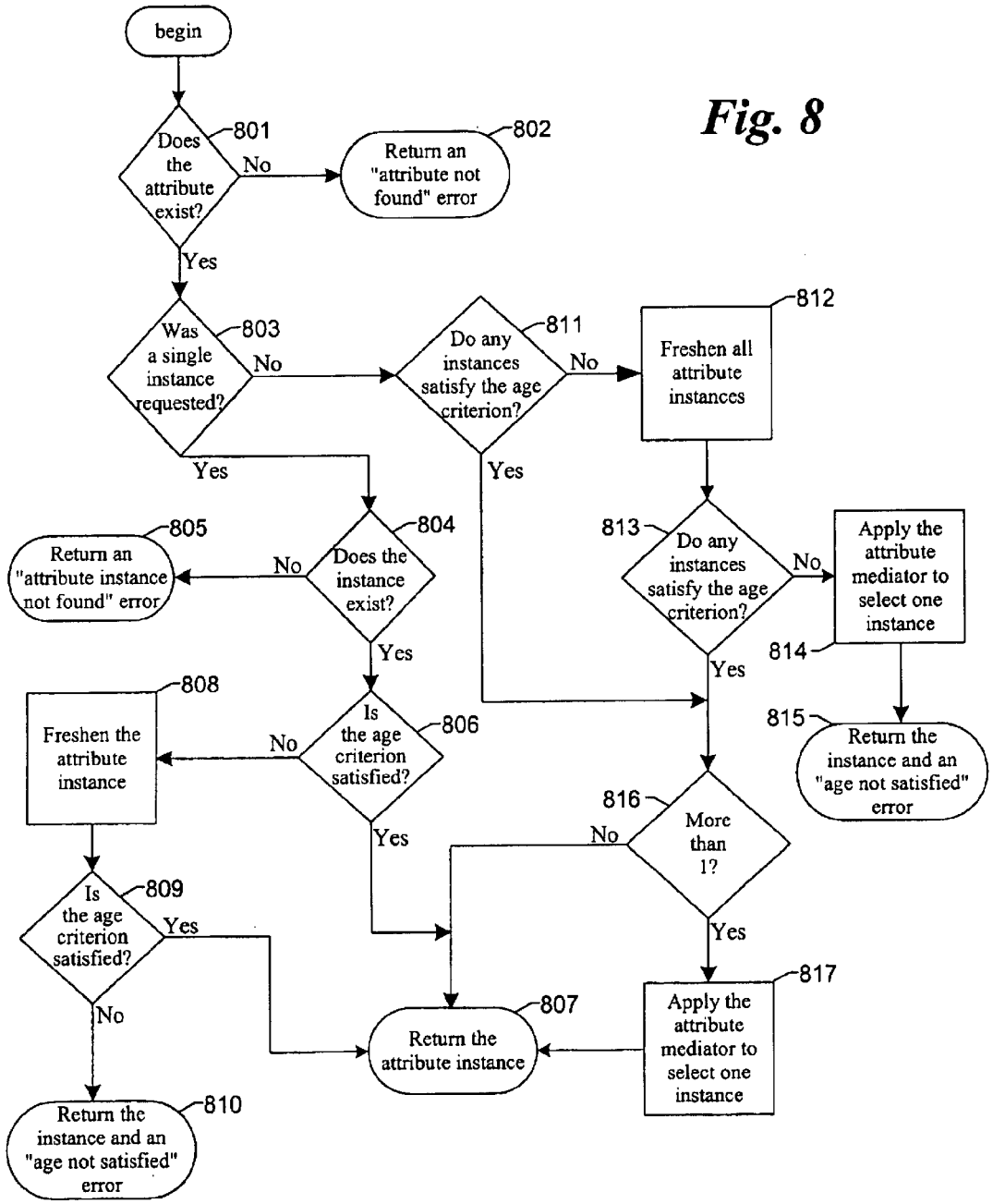
FIG. 8 is a flow diagram of an embodiment of the GetAttribute function.

FIG. 8 is a flow diagram of one embodiment of the GetAttribute function. In step 801, if the requested attribute exists, then the facility continues in step 803, else the facility continues in step 802 to return an "attribute not found" error. In step 803, if a single instance of the attribute was requested, then the facility continues in step 804, else the facility continues in step 811. In step 804, if the requested instance exists, then the facility continues in step 806, else the facility continues in step 805 to return an "attribute instance not found" error. In step 806, if the age criterion specified for the attribute request is satisfied, then the facility continues in step 807 to return the requested attribute instance, else the facility continues in step 808 to "freshen" the attribute instance by calling the appropriate context server's request handler to request evaluation of the attribute instance. In step 809, if the age criterion is satisfied by the freshened attribute instance, then the facility continues in step 807 to return the freshened attribute instance, else the facility continues in step 810 to return the freshened attribute instance with an "age not satisfied" error. In step 811, where a single attribute instance was not requested, if any registered instances of the attribute satisfy the age criterion, then the facility continues in step 816, else the facility continues in step 812. In step 812, the facility freshens all registered instances of the requested attribute. In step 813, if any of the attributes freshened in step 812 satisfy the age criterion, then the facility continues in step 816, else the facility continues in step 814. In step 814, the facility applies the requested attribute mediator to select one instance, or otherwise derive a value from the registered instances. In step 815, the facility returns the instance with an "age not satisfied" error. In step 816, where one or more instances satisfy the age criterion, if more than one instance satisfies the age criterion, then the facility continues in step 817, else the facility continues in step 807 to return the attribute instance that satisfies the age criterion. In step 817, the facility applies the requested attribute mediator to select one instance from among the instances that satisfy the age criterion, or to otherwise derive a value from the instances that satisfy the age criterion. After step 817, the facility continues in step 807 to return the value produced by the mediator.

FIG. 9 is a data structure diagram showing updated contents of the attribute instance table illustrated in FIG. 7. It can be seen in attribute instance table 900 that, upon reevaluation by the ips context server of its instance of the user.elevation attribute, the characterization module replaced the former contents of the value, uncertainty and timestamp fields of row 903 with the values resulting from the reevaluation.

FIG. 10 is a data structure diagram showing an example condition table that contains a portion of the state of the characterization module. Condition table 1000 has a row for each condition created by a context client. Row 1001 contains a condition name field 1011 containing the name of the condition, a context client name 1012 identifying the context client that created the condition, a first logical parameter field 1013 and a second logical parameter field 1014 identifying attributes or conditions that are to be compared, a comparison value 1015 that specifies a value to which an attribute listed in the first logical parameter is compared if no second logical parameter is listed, and a logical operator 1016 identifying the logical operator to be applied in the comparison.

Figure 11:
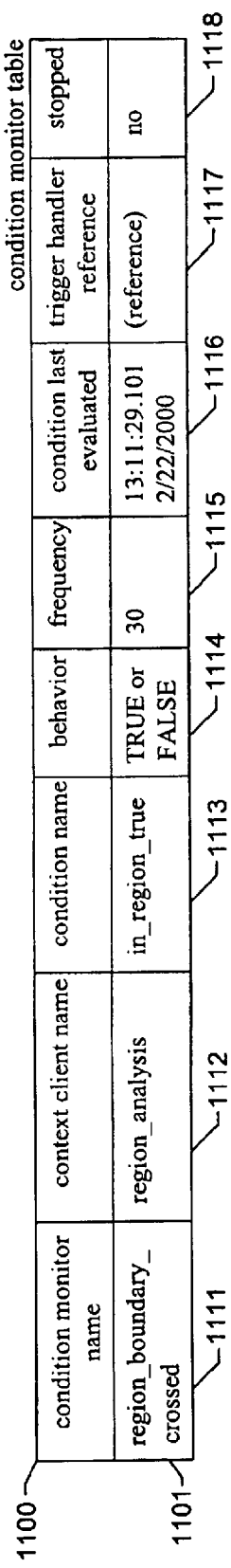
FIG. 11 is a data structure diagram showing an example condition monitor table that maintains a portion of the state of the characterization module.

FIG. 11 is a data structure diagram showing an example condition monitor table that maintains a portion of the state of the characterization module. Condition monitor table 1100 has a row 1101 corresponding to a condition and containing each of the following fields: a condition monitor name field 1111 containing the name of the condition monitor; a context client name field 1112 containing the name of the context client that created the condition monitor; a condition name field 1113 that contains the name of the condition monitored by the condition monitor; a behavior field 1114 that indicates whether the condition monitor is triggered when the condition becomes true, when it becomes false, or when it changes value in either direction; a frequency field 1115 showing the frequency with which the condition monitor evaluates the condition; a condition last evaluated field 1116 showing the time at which the condition monitor last evaluated the condition; a trigger handler reference 1117 that identifies a trigger handler function of the context client that is to be called when the condition monitor is triggered; and a stop field 1118 that indicates whether the context client has suspended operation of the condition monitor. Such condition monitors can be used in a variety of ways. For example, when a context client is notified via the triggering of the trigger handler function that the value has changed, the context client can then retrieve the new value.

Figure 12:
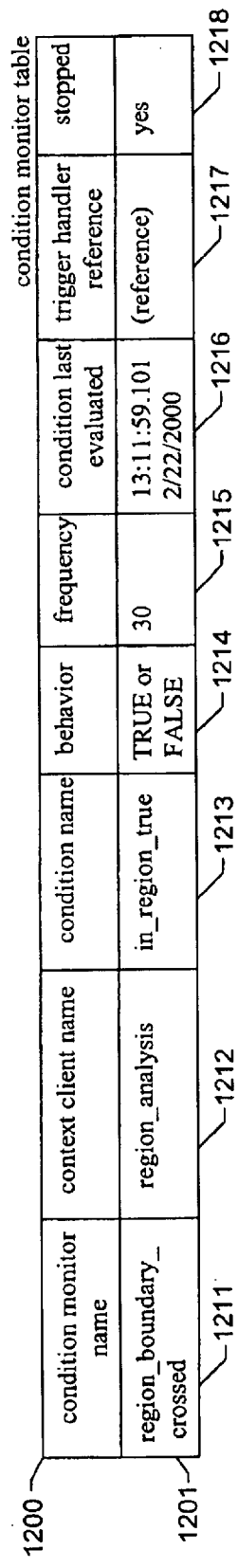
FIG. 12 is a data structure diagram showing updated contents of the condition monitor table.

FIG. 12 is a data structure diagram showing updated contents of the condition monitor table illustrated in FIG. 11. It can be seen from stop field 1218 of row 1201 in condition monitor table 1200 that the region_analysis context client has stopped, or suspended the operation of, the region_boundary_cross condition monitor, perhaps in response to the observation that the user is now asleep and his or her location will remain constant.

In the foregoing, the facility is described as being implemented using a characterization module that is called by context servers and context clients, that caches attribute values, and that maintains status information about the operation of context servers and context clients. In an alternative preferred embodiment, however, the facility operates without the use of such a characterization module. In this embodiment, context servers communicate directly with context clients.

Figure 13:
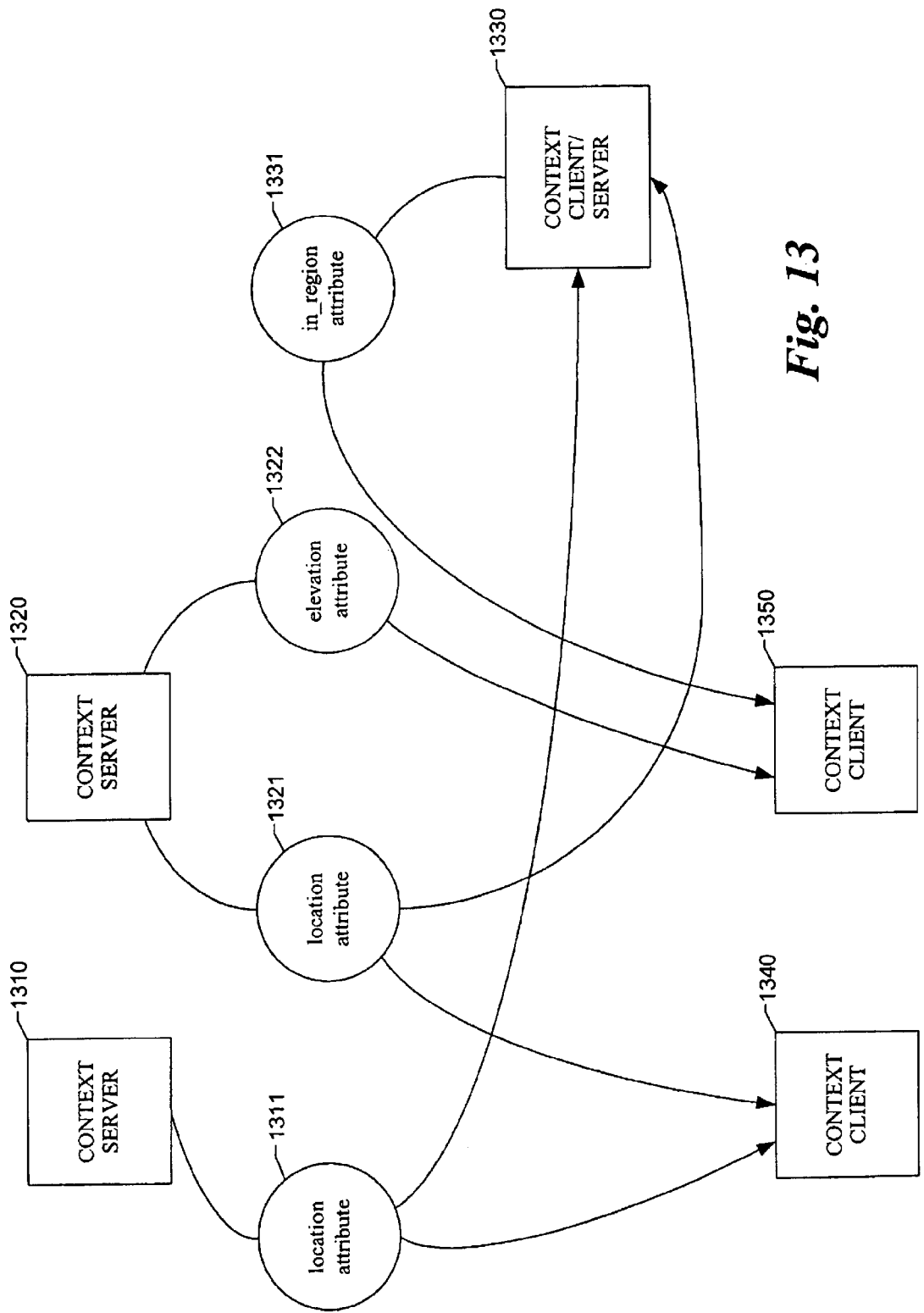
FIG. 13 is a data flow diagram showing the operation of the facility without a characterization module.

FIG. 13 is a data flow diagram showing the operation of the facility without a characterization module. It can be seen in FIG. 13 that context servers 1310, 1320, and 1330 provide attributes directly to context clients 1330, 1340, and 1350. For example, it can be seen that context server 1320 provides a user.elevation attribute 1322 directly to context client 1350. In this embodiment, the context client may itself cache attribute values recently obtained from a context server. Further, in this embodiment, context clients may themselves interrogate context servers for an enumeration of their attributes, and mediate between attribute instances provided by different context servers. For example, context client 1340 may mediate between the instance 1311 of the user.location attribute provided by context server 1310 and the instance 1321 of the user.location attribute provided by context server 1320.

In additional preferred embodiments, the facility may operate with a partial characterization module. Such a partial characterization module may include various combinations of the functionalities of routing communication between context servers and the context clients that consume their attribute values, caching attribute values, enumerating available attributes, and providing attribute mediation.

In additional preferred embodiments, the facility may provide a characterization module that implements a "push" information flow model in which, each time an attribute value provided by a context server changes, the new value is automatically provided to context clients. In further preferred embodiments, the facility provides a characterization module that implements a "pull" information flow model, in which attribute values are only obtained by the characterization module from the context servers when they are requested by a context client. In additional preferred embodiments, characterization modules are provided that support a variety of other information flow models.

Figure 17:
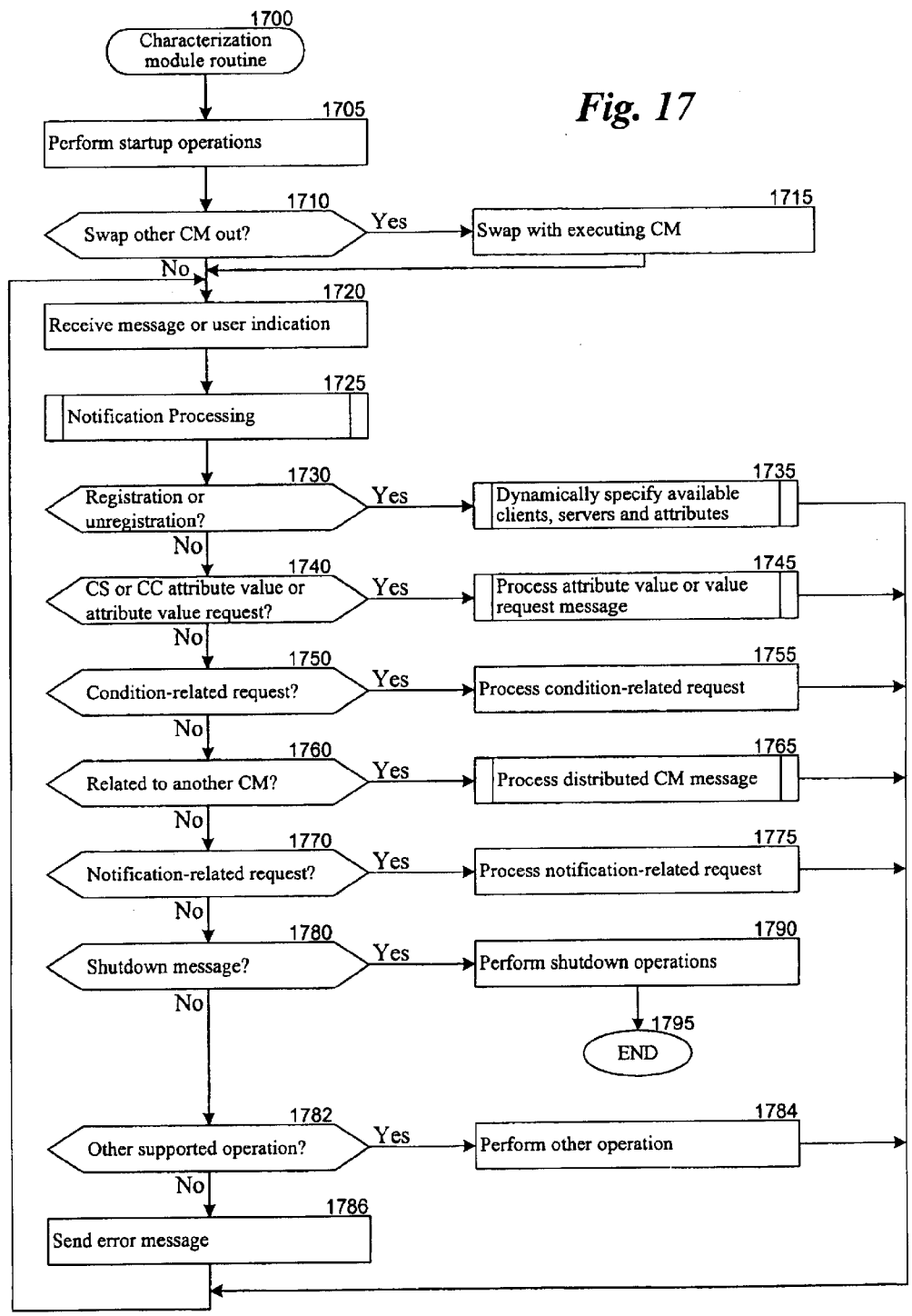
FIG. 17 is a flow diagram of an embodiment of the Characterization Module routine.

FIG. 17 is a flow diagram of an embodiment of the Characterization Module routine 1700. The routine receives messages from context clients (CCs) and from context servers (CSes), as well as instructions from users, and processes the messages or instructions. In some embodiments, a CM could wait to execute code that would provide functionality until the functionality was requested, such as by dynamically loading code to provide a requested mediator. The routine begins in step 1705, where the characterization module (CM) performs various startup operations (e.g., setting up tables in which to temporarily cache state information, retrieving previous state information, launching CSes or CCs that have previously registered with the CM, etc.). The routine then continues to step 1710 to determine if the newly started CM is to take the place of another previously executing CM (e.g., based on a user indication when the new CM was started). If so, the routine continues to step 1715 to swap places with the other executing CM. One method of executing a swap that would be transparent to the CCs and CSes interacting with the other CM would be to request the other CM to transfer all of its current state information to the new CM (e.g., registrations of CCs, CSes, and attributes, conditions and notification requests, cached values for attributes and attribute properties, etc.), to then update the other CCs and CSes so that the messages they previously sent to the other CM will now be sent to the new CM, and to then have the other CM shutdown.

After step 1715, or if it was determined in step 1710 that another CM is not being swapped out, the routine continues to step 1720 to receive an indication from a user or a message from a CC or CS. The routine then continues to step 1725 where it performs the Notification Processing subroutine to notify any CCs or CSes about the received message or user indication if appropriate. As is explained in greater detail below, CCs and CSes can submit notification requests so that they will be notified by the CM upon a particular type of occurrence. Such notification requests could include occurrences such as when an attribute value changes, when a particular CC or CS registers or unregisters, when values for an attribute become available or unavailable (e.g, due to registration or unregistration), when a CC registers or unregisters to receive values for an attribute, when the availability of particular input/output devices changes or other computer system features change, when a package of related themed attributes becomes available or unavailable, for changes in CM internal status (e.g., a change in the default mediator), etc. In addition, the notification requests can be created based not only on explicit requests, but also after the occurrence of a particular type of event (e.g., if a CC requests a value for an attribute for which no CSes are currently supplying values, a notification request could be automatically created to alert the CC if a CS later registers to supply values for the attribute). Moreover, additional information about the notification requests can be supplied (e.g., a number of times that the submitter wants to receive notifications for the request, or an expiration date after which the notification will be removed or become inactive).

After step 1725, the routine continues to step 1730 to determine if a registration or unregistration message was received. If so, the routine continues to step 1735 to execute the Dynamically Specify Available Clients, Servers, and Attributes subroutine. Thus, CCs and CSes can register and unregister dynamically as they become available or unavailable, and can similarly modify the status of the attributes that they have registered with the CM. If a registration or unregistration message was not received in step 1730, the routine instead continues to step 1740 to determine if an attribute value or a request for an attribute value has been received from a CC or CS. If so, the routine continues to step 1745 to execute the Process Attribute Value Or Value Request Message subroutine. This subroutine will satisfy requests for attribute values if possible (e.g., by supplying a cached value or requesting one or more CSes to supply the value) and will return the requested value or an error message. Similarly, when attribute values are pushed to the CM from a CS, the CM will send the values if appropriate to CCs that have registered an interest in receiving values for the attribute.

If an attribute value or an attribute value request has not been received from a CC or CS in step 1740, the routine instead continues to step 1750 to determine if a request has been received to establish or modify a condition that monitors attribute values or other conditions, or to establish or modify a condition monitor. If so, the routine continues to step 1755 to process the request. As described previously, conditions and condition monitors can be created, removed, and have their operation suspended (e.g., by deactivating them) or resumed (e.g, by activating them).

If a condition-related request was not received in step 1750, the routine continues instead to step 1760 to determine if a message related to one or more other executing CMs has been received, and if so continues to step 1765 to process the message by executing the Process Distributed Characterization Module Message subroutine. Characterization modules can interact for a variety of reasons, as explained in greater detail below. If a message related to another CM has not been received, the routine continues instead to step 1770 to determine if a request has been received to establish or modify a notification request. If so, the routine continues to step 1775 to process the notification-related request. If a notification-related request was not received, the routine continues instead to step 1780 to determine if a shutdown message was received (e.g., from a user). If so, the routine continues to step 1790 to perform shutdown operations (e.g., notifying all registered CCs and CSes to unregister, or saving current state information), and then continues to step 1795 and ends. If it was instead determined that a shutdown message was not received, the routine continues to step 1782 to determine if another supported operation has been requested. If so, the routine continues to step 1784 to perform the other operation, and if not the routine continues to step 1786 to send an error message to the requester. For example, other types of operations may be a request to receive information about all available attributes, about all attributes available from a particular CS, about which CCs are receiving values for a particular attribute, about properties and property values associated with attributes and attribute instances, to launch or shutdown a CC or CS, to receive information about an attribute taxonomy, to force a CS to reevaluate the values for all its registered attributes, to change internal CM information (e.g., the default mediator), to provide information about available packages of related themed attributes, to provide information about available computer resources such as input/output devices, etc. After steps 1735, 1745, 1755, 1765, 1775, 1784, or 1786, the routine returns to step 1720. In other embodiments, additional types of functionality may be available or illustrated functionality may not be available. For example, in some embodiments any CC or CS may need to satisfy security requirements (e.g., by verifying their identity as an authorized module) before being allowed to request information or functionality from the CM or to provide information to the CM.

Figure 18:
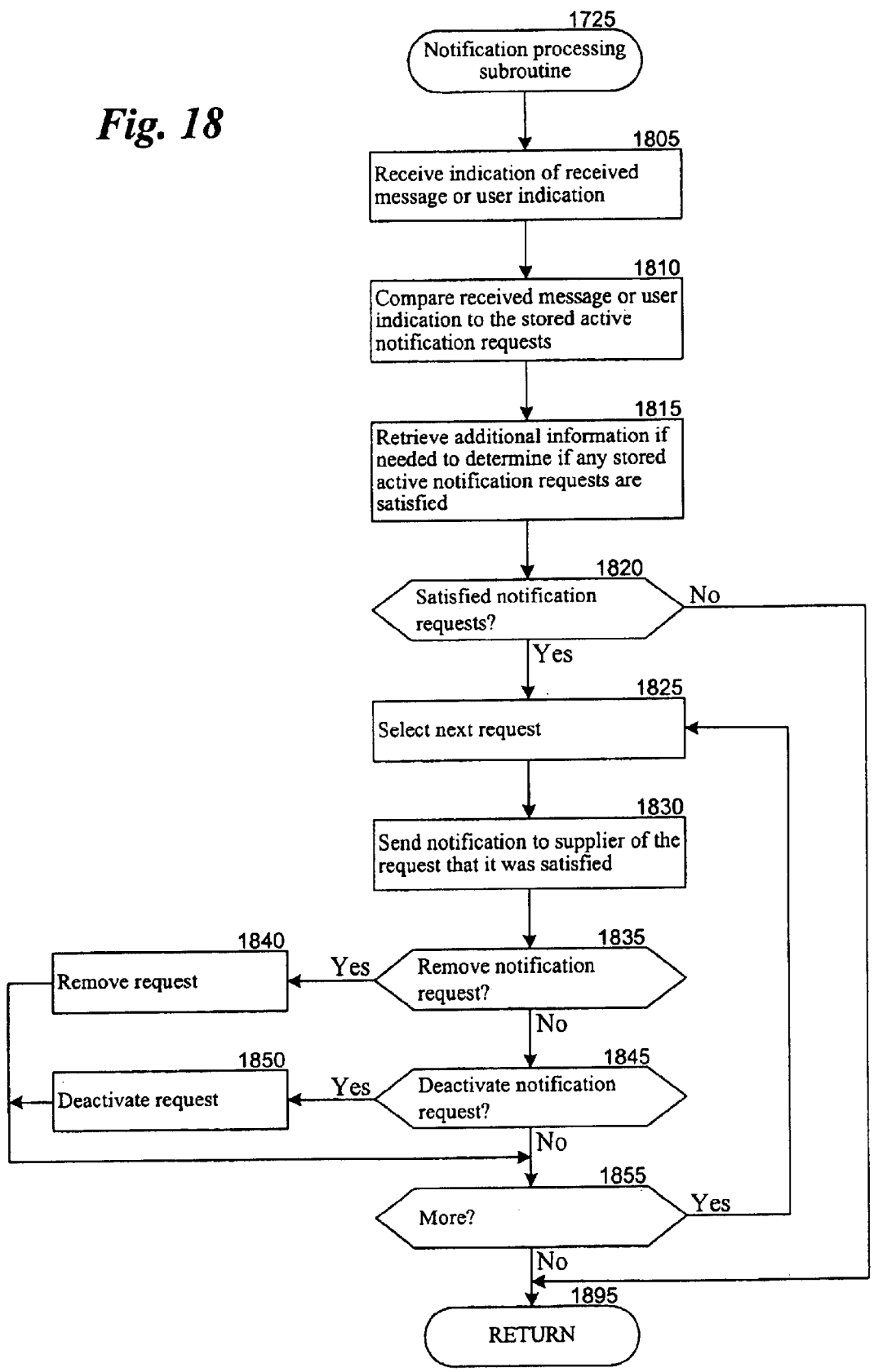
FIG. 18 is a flow diagram of an embodiment of the Notification Processing subroutine.

FIG. 18 is a flow diagram of an embodiment of the Notification Processing subroutine 1725. The subroutine examines the message or user indication received by the CM, determines whether any active notification requests are satisfied by the type of message or indication or by information contained in the message or indication, and notifies the submitters of any such requests when the requests are satisfied. The subroutine begins in step 1805 where it receives an indication of the message or user indication received by the CM. The subroutine continues to step 1810 to compare the received message or user indication to the notification requests that are currently stored and active. The subroutine then continues to step 1815 to retrieve any additional information that may be needed to determine if a notification request has been satisfied (e.g., a previous value for an attribute to determine how the attribute value has changed).

The subroutine then continues to step 1820 where it determines if any of the notification requests have been satisfied. If not, the subroutine continues to step 1895 and returns, but if so the subroutine continues to step 1825 to select the next satisfied notification request, beginning with the first. The subroutine then continues to step 1830 to send a notification to the supplier of the request that the request was satisfied, and can include additional information about the occurrence that satisfied the request. The subroutine then continues step 1835 to determine whether the notification request should be removed (e.g., if it was defined as a one-time request, or has expired). If so, the subroutine continues to step 1840 to remove the request, and if not the subroutine continues to step 1845 to determine if the notification request should be deactivated for the current time (e.g., so that a similar occurrence can be monitored at a later time). After steps 1840 or 1850, or if the notification request was not deactivated, the subroutine continues to step 1855 to determine if there are more satisfied notification requests. If so, the subroutine returns to step 1825, and if not the subroutine continues to step 1895 and returns. In addition, the subroutine could periodically check the various stored notification requests (e.g., as a background process) to determine if their status should be modified (e.g., activated, deactivated, or removed).

Figure 19:
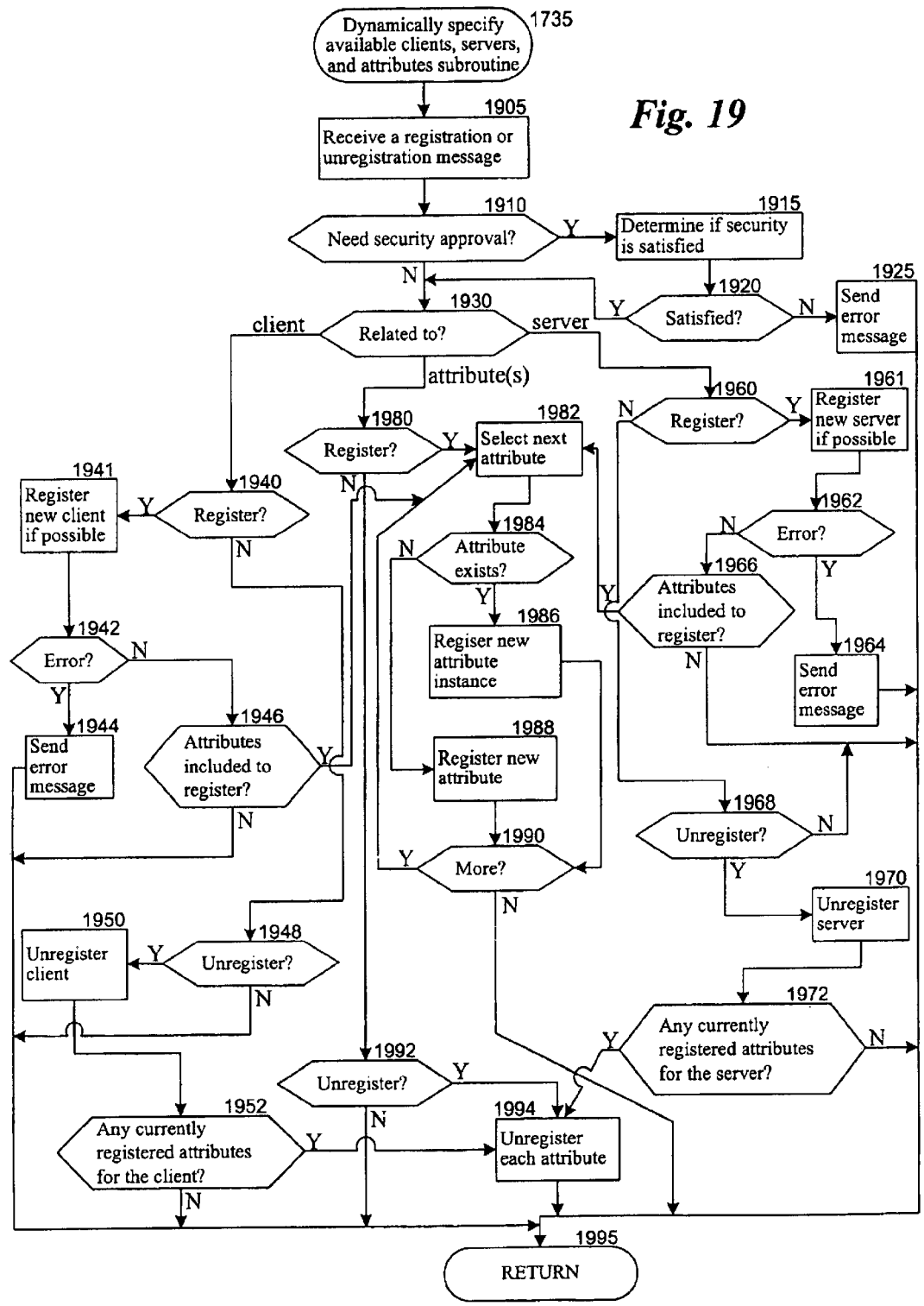
FIG. 19 is a flow diagram of an embodiment of the Dynamically Specify Available Clients, Servers, and Attributes subroutine.

FIG. 19 is a flow diagram of an embodiment of the Dynamically Specify Available Clients, Servers, and Attributes subroutine 1735. The subroutine receives registration or unregistration requests for CCs, CSes, and/or attributes, and satisfies the requests as appropriate. The subroutine begins in step 1905 where it receives a registration or unregistration message. The subroutine continues to step 1910 to determine if security authorization is needed (e.g., for any CC or CS, or for CCs and CSes executing on a different computer from the CM). If so, the subroutine continues to step 1915 to determine if the security authorization has been satisfied (e.g., by the submitter of the message supplying a password or a verified digital signature). It is determined in step 1920 that the security authorization has not been satisfied, the subroutine continues to step 1925 where it sends an error message to the submitter. However, if it is instead determined that the security standard has been satisfied, or if security authorization was not needed in step 1910, the subroutine continues to step 1930 to determine the type of the registration or unregistration message.

If the message is determined to be related to a CC, the subroutine continues to step 1940 to determine if the message is to register the CC. If so, the subroutine continues to step 1941 to register the new client if possible (e.g., if all necessary information has been provided and there is not another registered CC with the same unique identifier). If it is determined in step 1942 that an error occurred during the registration attempt, the subroutine continues to step 1944 to send an error message to the submitter. If no error occurred, the subroutine instead continues to step 1946 to determine if the registration request includes one or more attributes of interest to be registered for the client. If so, the subroutine continues to step 1982 to register those attributes. If it was instead determined in step 1940 that the received message was not to register the client, the subroutine continues to step 1948 to determine if the message was to unregister the client. If so, the subroutine continues to step 1950 to unregister the client, and then continues to step 1952 to determine if any registered attributes remain for the client. If so, the subroutine continues to step 1994 to unregister each of those attributes.

If it was instead determined in step 1930 that the received message was related to a CS, the subroutine continues to step 1960 to determine whether the message is to register the CS. If so, the subroutine continues to step 1961 to register the new server if possible. It is determined in step 1962 that an error occurred during the registration attempt, the subroutine continues to step 1964 to send an error message to the submitter. If no error occurred, however, the subroutine instead continues to step 1966 to determine if the registration request includes one or more attributes to register for which the server is available to supply values. If so, the subroutine continues to step 1982 to register those attributes. If it was instead determined in step 1960 that the received message was not to register the CS, the subroutine continues to step 1968 to determine if the message was to unregister the server. If so, the subroutine continues to step 1970 to unregister the server, and then continues to step 1972 to determine if any registered attributes remain for the server. If so, the subroutine continues to step 1994 to unregister those attributes.

If it was instead determined in step 1930 that the received message was related only to one or more attributes and not to a CC or CS, the subroutine continues to step 1980 to determine whether the message is to register those attributes. If so, the subroutine continues to step 1982 to select the next attribute, beginning with the first. The subroutine then continues to step 1984 to determine if at least one instance of the attribute is currently registered. If so, the subroutine continues to step 1986 to register a new instance of the attribute, and if not the subroutine continues to step 1988 to register the first instance for the attribute. After steps 1986 or 1988, the subroutine continues to step 1990 to determine if there are more attributes to be registered, and if so returns to step 1982. If it is instead determined in step 1980 that the received message was not to register the attributes, the subroutine continues to step 1992 to determine if the message was to unregister the attributes, and if so continues to step 1994 to unregister each attribute. After steps 1925, 1964, 1944, or 1994, or if the determination was made in the negative for one of steps 1946, 1948, 1952, 1966, 1972, 1990, or 1992, the subroutine continues to step 1995 and returns. As discussed previously, a variety of other types of optional information can additionally be supplied when registering CCs, CSes or attributes (e.g., various properties for the attribute).

Figure 20A:
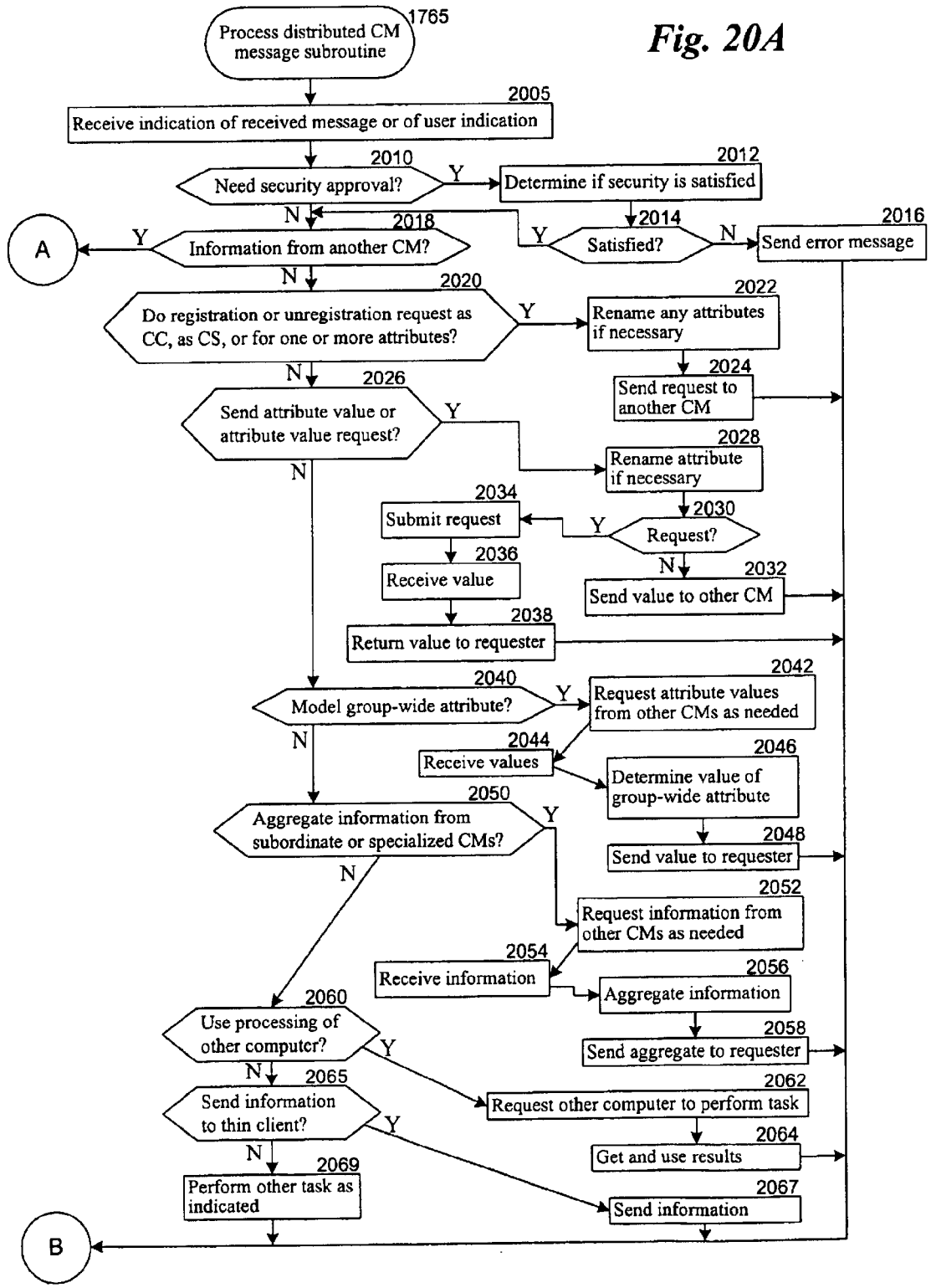
FIG. 20 is a flow diagram of an embodiment of the Process Distributed Characterization Module Message subroutine.
Figure 20B:
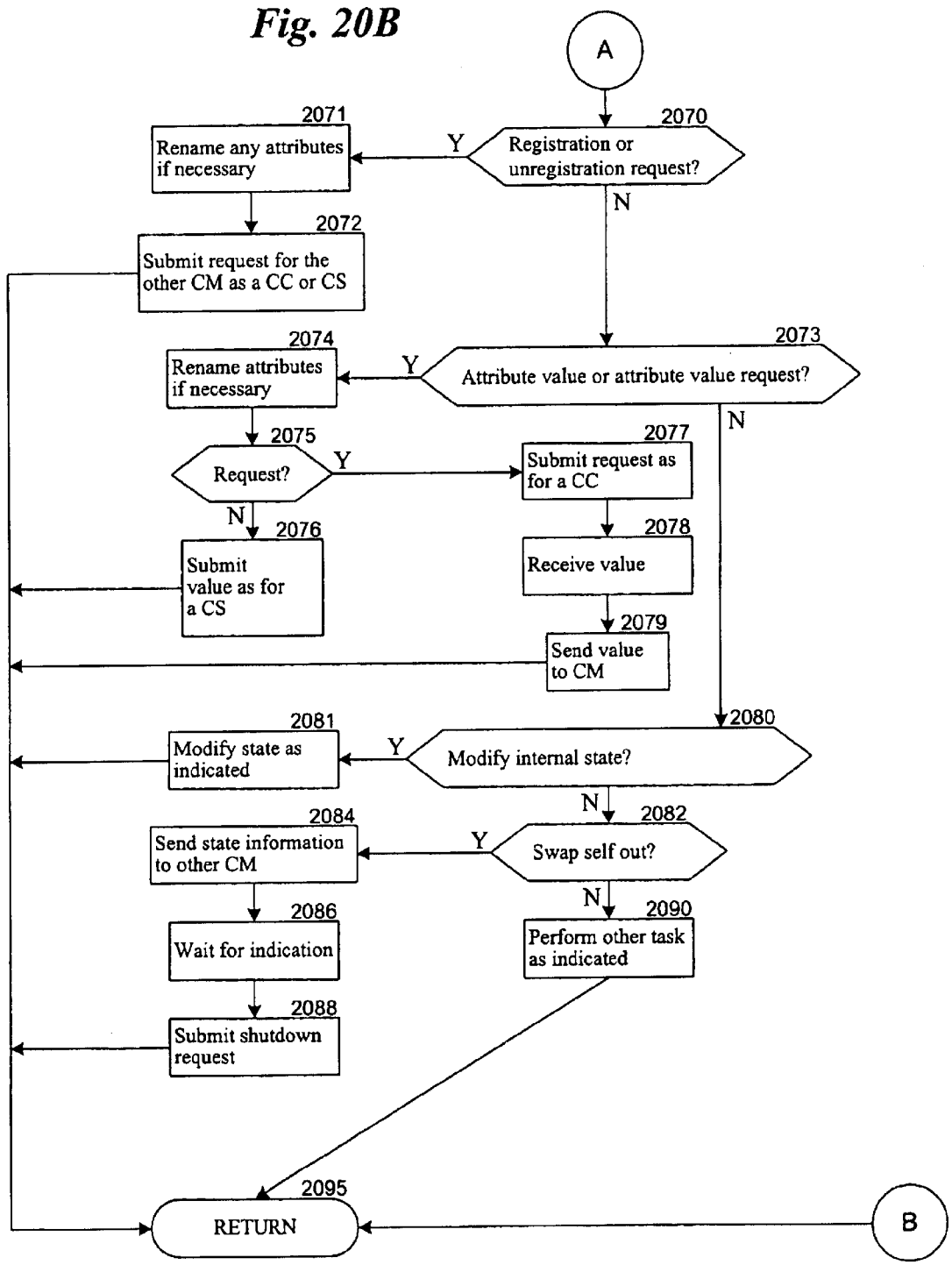

FIG. 20 is a flow diagram of an embodiment of the Process Distributed Characterization Module Message subroutine 1765. The subroutine receives information from another CM or an instruction about another CM, and processes the information or instruction as appropriate. The subroutine begins in step 2005 where it receives an indication of the received information or instruction. The subroutine then continues to step 2010 to determine if security authorization is needed. If so, the subroutine continues to step 2012 to determine if the security has satisfied. It is determined at step 2014 that the security authorization has not been satisfied, the subroutine continues to step 2016 to send an error message to the submitter. If it is instead determined that the security authorization has been satisfied or was not needed in step 2010, the subroutine continues to step 2018 to determine whether information from another CM has been received.

If it is determined in step 2018 that an instruction about another CM has been received, the subroutine continues to step 2020 to determine if the instruction is to register or unregister as a CC or CS of the other CM. If so, the subroutine continues to step 2022 to rename any attributes in the request if necessary. For example, if a current CM 1 wants information about an attribute user.mood.happiness for its own user from another CM 2, CM 1 will have to modify the name of the attribute (e.g., to CM1.user.mood.happiness) it requests since CM 2's attribute user.mood.happiness will refer to the user of CM 2. The same will be true for a variety of other attributes that specify attributes relative to the CM, but not to attributes with absolute specifications (e.g., person.ABC.mood.happiness). After step 2022, the subroutine then continues to step 2024 to send a request to the other CM to reflect the request using the renamed attributes, with the other CM to perform the registration or unregistration.

If it is instead determined in step 2020 that the instruction was not to register or unregister, the subroutine continues to step 2026 to determine whether the instruction is to send an attribute value or an attribute value request to the other CM. If so, the subroutine continues to step 2028 to rename any attributes in the request if necessary, and then continues to step 2030 to determine whether a request or an attribute value is being sent. If an attribute value is being sent, the subroutine sends the value to the other CM in step 2032, and if a request is being sent the subroutine sends the request in step 2034. After step 2034, the subroutine continues to step 2036 to receive the requested value or an error message, and if the value is received rather than an error message, the subroutine sends the received value to the requester at step 2038.

If it is instead determined in step 2026 that the received instruction is not to send an attribute value or an attribute value request, the subroutine continues to step 2040 to determine if a group-wide attribute is to be modeled (e.g., troop morale for a group of soldiers that would require information for many or all of the soldiers). If so, the subroutine continues to step 2042 to request attribute values from the other CMs that are needed for the modeling, and then continues to step 2044 to receive the requested values or error messages. If the necessary values are received to perform the modeling, in step 2046 the subroutine determines the value of the group-wide attribute and in step 2048 sends the value to the requester. In alternate embodiments, any such modeling of attributes may be performed only by CSes, with the CM merely requesting values from other CMs as instructed and supplying the received values to the appropriate CS.

If it is instead determined in step 2040 that the received instruction is not to model a group-wide attribute, the subroutine continues to step 2050 to determine if the instruction is to aggregate information from subordinate CMs (e.g., in a hierarchical organization such as a business or the military, the hierarchy of users can be reflected in a hierarchy of their CMs) or specialized CMs (e.g., a CM specialized to monitor a user's health and to detect health problems). If so, the subroutine continues to step 2052 to request the information from the other CMs as needed, and continues to step 2054 to receive the requested information or error messages. If the necessary information is received, in step 2056 the subroutine aggregates the information, and in step 2058 sends the aggregated information to the requester. In alternate embodiments, any such aggregating of information may be performed only by CSes, with the CM merely requesting information from other CMs as instructed and supplying the received values to the appropriate CS.

If it is instead determined in step 2050 that the received instruction is not to aggregate information, the subroutine continues to step 2060 to determine if the received instruction is to use the processing capabilities of another computer or CM. If so, the subroutine continues to step 2062 to request the other computer or CM to perform an indicated task. The subroutine then continues to step 2064 where it receives the results of the task, and uses those results as if the task have been performed locally. If it is instead determined in step 2060 that the received instruction is not to use the processing abilities of another computer, the subroutine continues to step 2065 to determine if the received instruction is to send information to a module such as a thin client. If so, the subroutine continues to step 2067 to send the indicated information (e.g, from a CC), and if not the subroutine continues to step 2069 to perform another task as indicated. For example, other types of tasks could be to instruct another CM to swap itself out or to modify its internal state (e.g., to change a default mediator or to add a new mediator).

If it was instead determined at step 2018 that information from another CM has been received, the subroutine continues to step 2070 to determine if a registration or unregistration request has been received. If so, the subroutine continues to step 2071 to rename any attributes if necessary, and then continues to step 2072 to resubmit the request as if from a CC or a CS using the renamed attributes. If the information was not a registration or unregistration request, the subroutine continues to step 2073 to determine if an attribute value or an attribute value request has been received. If so, the subroutine continues to step 2074 to rename the attributes if necessary, and then continues to step 2075 to determine whether an attribute value or an attribute value request has been received. If an attribute value has been received, the subroutine continues to step 2076 where it resubmits the value as being from a CS, and if not the subroutine continues to step 2077 where it resubmits the attribute value request as being from a CC. After step 2077, the subroutine continues to step 2078 where it receives the requested value or an error message, and in step 2079 sends the received value to the requesting CM if an error message was not received.

If it was instead determined in step 2073 that an attribute value or attribute value request was not received, the subroutine continues to step 2080 to determine if the received information was an indication to modify the internal state of the CM. If so, the subroutine continues to step 2081 where it modifies the state as indicated. If the received instruction was not to modify the internal state, the subroutine continues to step 2082 to determine if the request is to swap the CM out to be replaced by the other requesting CM. If so, the subroutine continues to step 2084 to send the current state information from the CM to the requesting CM. In addition, the CM could perform other tasks if necessary such as updating the currently registered CCs and CSes so that they now will communicate with the other CM. The subroutine then continues to step 2086 to wait for an indication from the other CM to exit, and after receiving the indication, submits a shutdown request in step 2088. If the received instruction was not to swap out, the subroutine continues to step 2090 to perform the other task as indicated if appropriate. After steps 2016, 2024, 2032, 2038, 2048, 2058, 2064, 2067, 2069, 2072, 2076, 2079, 2081, 2088, or 2090, the subroutine continues to step 2095 and returns.

Figure 21:
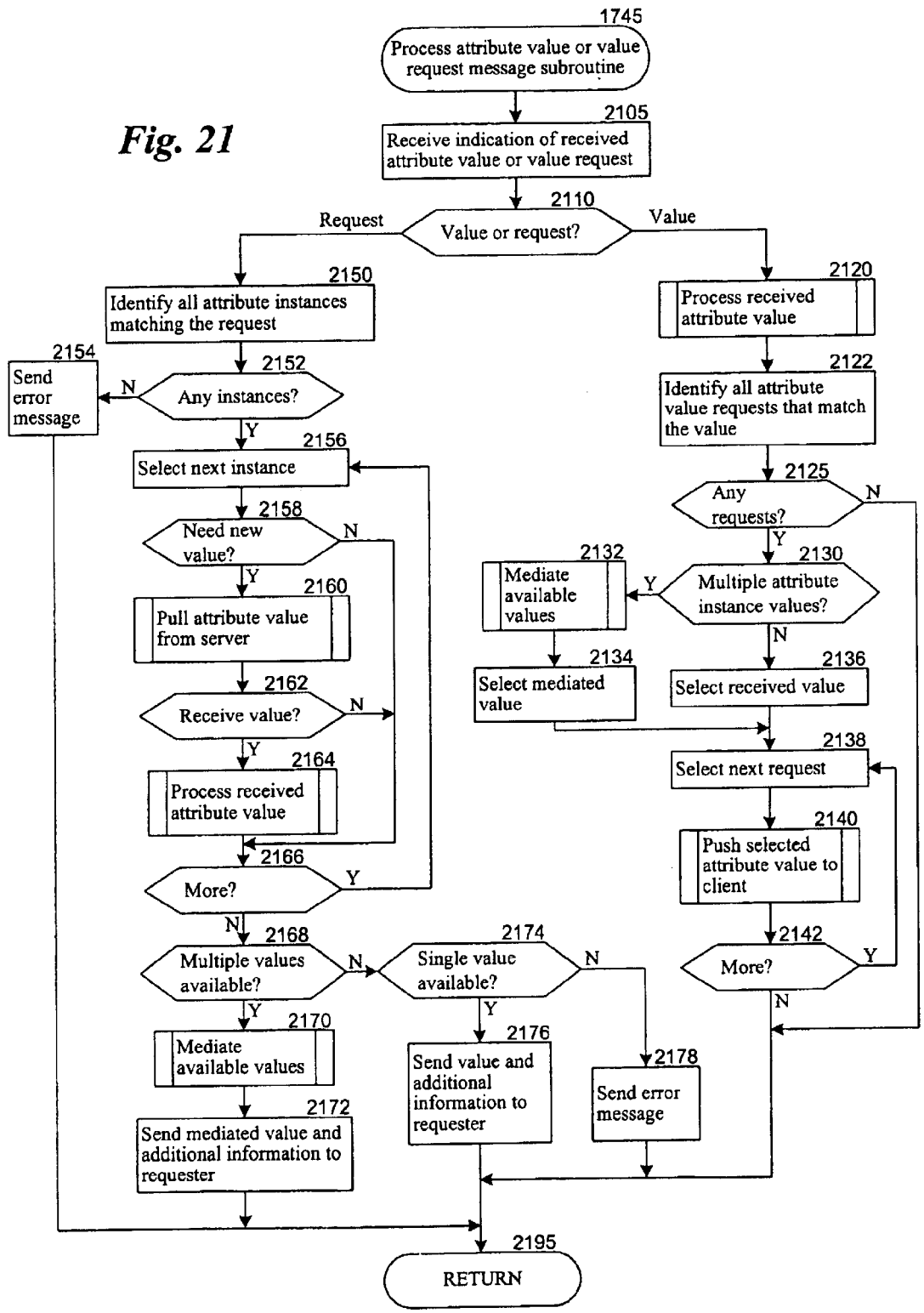
FIG. 21 is a flow diagram of an embodiment of the Process Attribute Value Or Value Request Message subroutine.

FIG. 21 is a flow diagram of an embodiment of the Process Attribute Value Or Value Request Message subroutine 1745, as illustrated in the accompanying figure and described elsewhere. In particular, the subroutine receives an indication of an attribute value or a request for an attribute value, and processes the value or request as appropriate (e.g., pulling values from servers when needed to satisfy requests and pushing received values to clients when appropriate). Those skilled in the art will appreciate that in other embodiments only one of the push and pull data flow models may be supported. The subroutine begins at step 2105 where it receives an indication of an attribute value or a request for an attribute value. The subroutine then continues to step 2110 to determine if an attribute value or a request was received.

If a value was received, the subroutine continues to step 2120 to execute the Process Received Attribute Value subroutine, such as to store the value and to process additional associated information received about the value. The subroutine next continues in the illustrated embodiment to push the received value or a related value to clients as appropriate. Those skilled in the art will appreciate that in other embodiments such values may merely be cached or otherwise stored until requested by a client. Alternately, even if received values are not generally pushed to clients, in other embodiments such values could be pushed to clients in limited circumstances, such as an update to a related value that had previously been sent to a client when the newly received value is more accurate.

In the illustrated embodiment, the subroutine continues to step 2122 to determine whether there are any previously specified requests or indications of interest related to the received value that would cause the received value or a related value to be pushed to one or more clients. If it is determined in step 2125 that there are any such requests or indications, the subroutine continues to step 2130 to determine if there are multiple attribute instance values available that meet the appropriate criteria (if any are specified) to satisfy the requests or indications. For example, a default or specified threshold for the freshness of values could be used as a criteria. If there are multiple values, the subroutine continues to step 2132 to execute the Mediate Available Values subroutine and produce a mediated value from the multiple available values, and in step 2134 selects the mediated value produced by the subroutine. If it was instead determined in step 2130 that there are not multiple attribute instance values available for the received value, the subroutine continues to step 2136 to select the received value. After steps 2134 or 2136, the subroutine continues to step 2138 to select the next request of the identified requests, beginning with the first request. The subroutine then continues to step 2140 to execute the Push Selected Attribute Value To Client subroutine for the selected request, and then continues to step 2142 to determine if there are more identified requests. If so, the subroutine returns to step 2138 to select the next request.

If it was instead determined in step 2110 that a request for a value was received, the subroutine continues to step 2150 to identify all attribute instances that match the request (e.g., that satisfy one or more criteria for the value that are specified with the request). The subroutine then continues to step 2152 to determine if there are any such instances, and if not continues to step 2154 to send an error message to the requester. In the illustrated embodiment, the subroutine next pulls current values for the identified attribute instances from servers as appropriate. Those skilled in the art will appreciate that in other embodiments only those values that have previously been received and stored may be supplied to clients. Alternately, even if current values are not generally pulled from servers, in other embodiments such values could be pulled from servers in limited circumstances, such as when explicitly requested by a client.

In the illustrated embodiment, if it is determined in step 2152 that at least one attribute instance is identified, the subroutine continues to step 2156 to select the next such instance, beginning with the first. The subroutine in step 2158 then determines if a new value is needed for the selected instance (e.g., the available value does not meet some specified criteria, such as an accuracy threshold specified by the requesting client). If so, the subroutine continues to step 2160 to execute the Pull Attribute Value From Server subroutine. The subroutine in step 2162 next waits for a value or error message response from the server, and determines if a value is received. If a value is received, the subroutine then continues to step 2164 to execute the Process Received Attribute Value subroutine. After step 2164, or if it was determined in step 2158 that the instance does not need a new value or in step 2162 that a new value was received, the subroutine continues to step 2166 to determine if there are more instances identified. If so, the subroutine returns to step 2156 to select the next such instance, and if not continues to step 2168 to determine if there are multiple values now available for the request that meet any relevant criteria. While all identified attribute instance values that match the request are used in the illustrated embodiment, in other embodiments a different or additional selection process for the values could be used. For example, information about the various servers that can supply the attribute instance values may be available (e.g., dynamically), and if so only certain of the servers could be selected based on the information with only the values from those servers being used.

If it is determined in step 2168 that there are multiple values available, the subroutine continues to step 2170 to execute the Mediate Available Values subroutine to produce a mediated value from the multiple available values, and in step 2172 sends the produced mediated value and any additional information about the value (e.g., properties, an associated uncertainty value, an indication of the server that produced the value, an indication of the mediator used to produce the value, etc.) to the requester. If it was instead determined in step 2168 that there are not multiple values available, the subroutine continues to step 2174 to determine if a single value is available, and if not continues to step 2178 to send an error message to the requester. If it is instead determined that there is a single value available, the subroutine continues to step 2176 and sends the value and any additional information to the requester. After steps 2154, 2172, 2176 or 2178, or if it was determined in step 2125 that there were no requests identified or in step 2142 that there were no more requests, the subroutine continues to step 2195 and returns.

Figure 22:
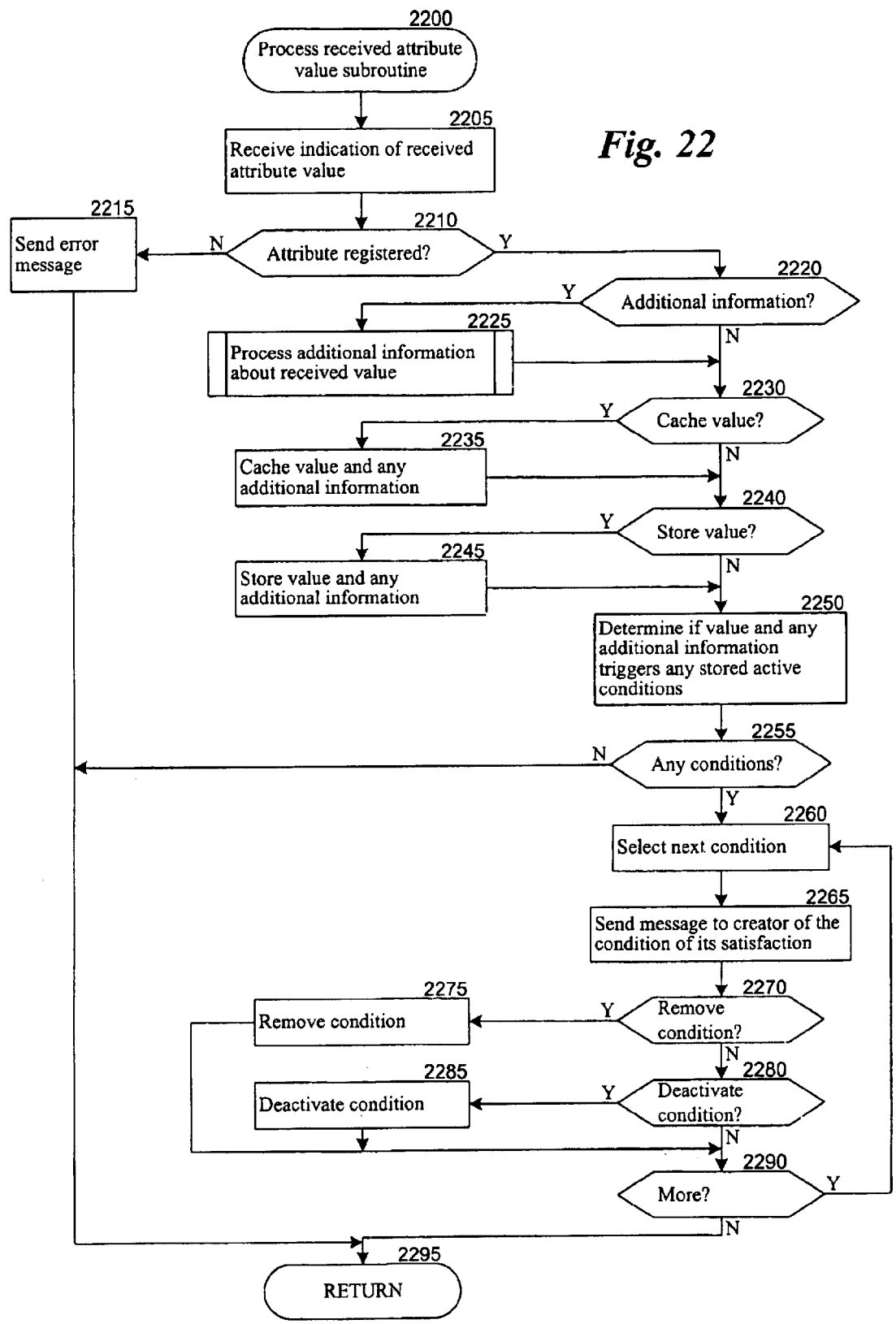
FIG. 22 is a flow diagram of an embodiment of the Process Received Attribute Value subroutine.

FIG. 22 is a flow diagram of an embodiment of the Process Received Attribute Value subroutine 2200, as illustrated in the accompanying figure and described elsewhere. In particular, the subroutine receives an attribute value from a server, stores the value if appropriate (e.g., in a cache or long-term storage), processes additional received information associated with the value if appropriate, and processes any conditions related to the received value. The subroutine begins in step 2205 where it receives an indication of a received attribute value. The subroutine then continues to step 2210 to determine if the attribute for which the value is received is registered, and if not continues to step 2215 to send an error message to the server. If it is instead determined in step 2210 that the attribute is registered, the subroutine continues to step 2220 to determine if additional information about the value was received from the server. If so, the subroutine continues to step 2225 to execute the Process Additional Information About Received Value subroutine.

After step 2225, or if it was instead determined that additional information about the value was not received from the server, the subroutine continues to step 2230 to determine whether values for the attribute are being cached or otherwise temporarily stored. If so, the subroutine continues to step 2235 to cache the received value as well as any additional information received. Those skilled in the art will appreciate that the length of time used for caching can vary in a variety of ways, such as based on the type of information or for a particular attribute. After step 2235, or if it was instead determined that values are not being cached for the attribute, the subroutine continues to step 2240 to determine if values for the attribute are being stored in a long-term manner (e.g., being logged). If so, the subroutine continues to step 2245 to store the received value as well as any additional information received.

After step 2245, or if it was instead determined in step 2240 that values are not being stored for the attribute, the subroutine continues to step 2250 to determine if the value and/or any additional information about the value triggers any active stored conditions. In step 2255, if there are any such conditions, the subroutine continues to step 2260 to select the next such condition, beginning with the first. After step 2260, the subroutine continues to step 2265 to send a message to the entity associated with the condition (e.g., a client that created the condition) to indicate that the condition is satisfied. After step 2265, the subroutine continues to step 2270 to determine if the condition should now be removed. If so, the subroutine continues to step 2275 to remove the condition, and if not the subroutine continues to step 2280 to determine if the condition should now be deactivated. If so, the subroutine continues to step 2285 to deactivate the condition. After steps 2275 or 2285, or if it was instead determined in step 2280 that the condition is not to be deactivated, the subroutine continues to step 2290 to determine if there are more triggered conditions. If so, the subroutine returns to step 2260 to select the next such condition. After step 2215, or if it was instead determined in step 2255 that there were not any triggered conditions or in step 2290 that there were no more triggered conditions, the subroutine continues to step 2295 and returns.

In the illustrated embodiment, attribute values are received by the characterization module from servers either when the characterization module requests a new value from the server or when the server pushes a new value to the characterization module. In some embodiments in which a server has previously sent an attribute value to the characterization module in response to a request, the server may later send updated values for the attribute to the characterization module without a later request from the characterization module, such as if a more accurate or updated value is obtained by the server. In addition, in other embodiments servers could provide other types of information that could be received and processed by the characterization module. In particular, a server could provide a variety of types of meta-information about attribute values to the characterization module, such as information about a technique used to generate a value or an indication that a new value is available without sending the value until requested.

Figure 23:
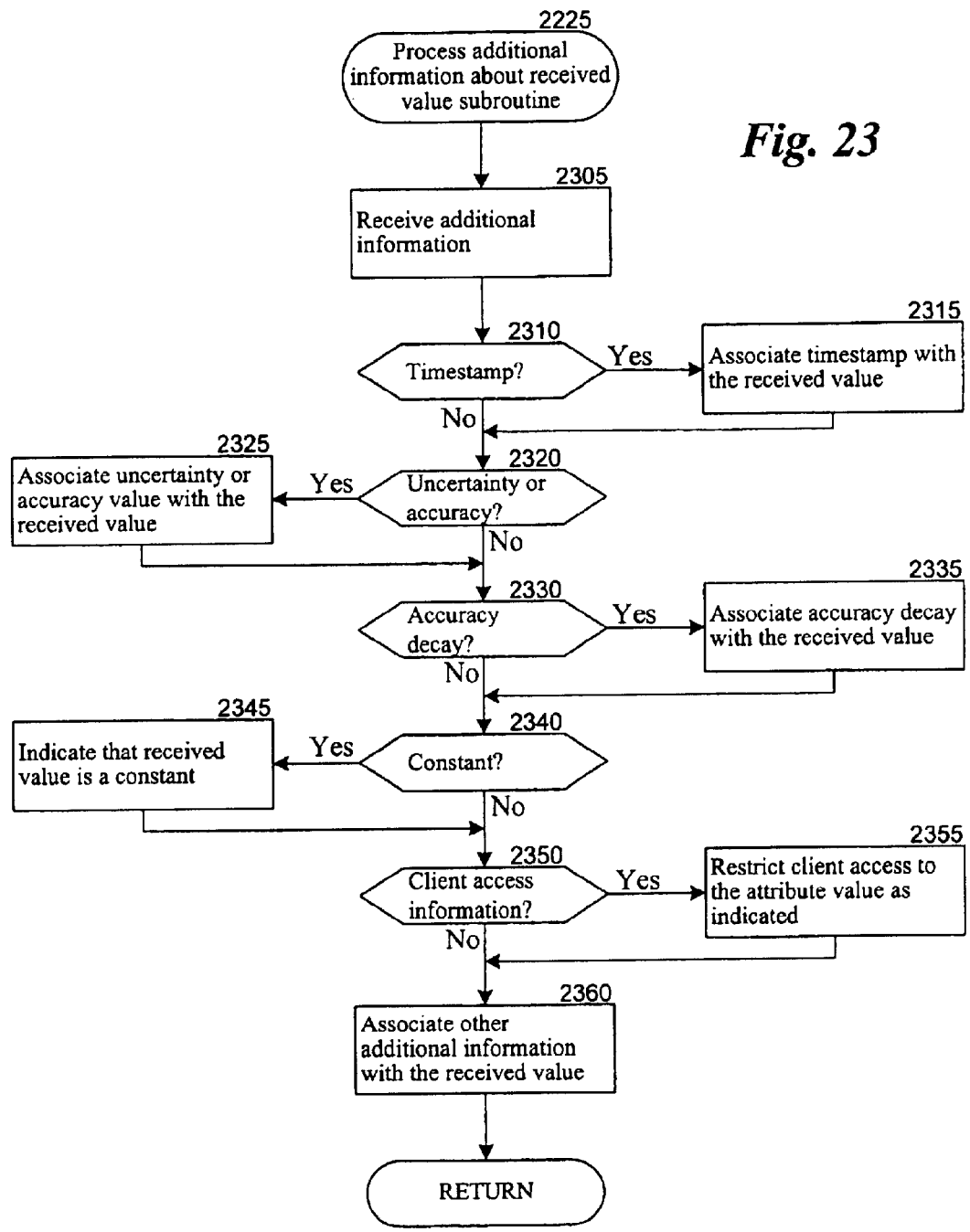
FIG. 23 is a flow diagram of an embodiment of the Process Additional Information About Received Value subroutine.

FIG. 23 is a flow diagram of an embodiment of the Process Additional Information About Received Value subroutine 2225, as illustrated in the accompanying figure and described elsewhere. As illustrated and discussed elsewhere, a variety of types of information related to attribute values (e.g. uncertainty or accuracy information, a timestamp of when the value was created or supplied or was most accurate, an indication that the value is a constant, indications of restrictions on whether the availability of the attribute instance or of the particular value should be available to any or to specified CCs, data type, units, a format version, a name, any generic attribute property supplied by the CS, etc.) can be received from CSes, can be used by the CM to determine whether and how to supply the values to CCs, can be supplied to CCs, and can be used by CCs when processing the received attribute values. For example, units as indicated below could be specified.

| Quantity Measured | Unit |
|---|---|
| Distance | Meter |
| Mass/Weight | Kilogram |
| Temperature | Centigrade |
| Time | Second |
| Speed | Meters per second |
| Acceleration | Meters per second$^2$ |
| Arc | Radians |
| Data size | Bytes |
| Data Throughput | Bytes per second |
| Force | Newtons |
| Power | Watts |
| Energy | Joules |

In addition, uncertainty of an attribute value can be indicated in a variety of ways. An example of an uncertainty specification is as follows. For each attribute instance there is a finite likelihood that the real quantity being measured is not the same as the value being expressed. For example, the speedometer of a car may show 30 mph when the "true" instantaneous speed is 32.56 mph. There are numerous factors that may give rise to these discrepancies, including the following: precision of measuring apparatus, conversion of continuous quantities to discrete values in the measurement process, random fluctuations, temporal variation, systematic errors, and measurement latency. Since different measured quantities have different sources of uncertainty, it is impossible to foresee and account for each individually. It is therefore helpful to express the overall effects with a general characterization of uncertainty. One type of uncertainty values represent the cumulative effects of all possible discrepancy sources. These uncertainty values may conform to a single, universal definition so that attribute mediators and clients can make effective use of them. Thus, the following definition of uncertainty, which is based upon the definition of standard deviation for random fluctuations about a mean value, could be used for numeric values:

For an attribute instance value, $\mu$, the associated uncertainty, $\sigma$, shall represent the likelihood that the following condition has a 68% probability of being true:

$$\mu_{true} - \sigma \leq \mu \leq \mu_{true} + \sigma$$

Where $\mu_{true}$ represents the "true" value that the attribute represents.

As with uncertainty, a value timestamp can be indicated in a variety of ways. An example of a timestamp specification is as follows. Attribute values may be thought of as representations of a particular quantity at a point in time. Often this time is not proximate to that of use, so it can be useful to provide the proper timestamp along with the value. One version of a timestamp is defined as follows:

The timestamp represents the moment at which the associated value would have been valid had it been measured directly at that moment. This definition results in some attributes having timestamps that do not correspond to the time at which their values were calculated. For instance, an attribute that represents the acceleration of the user can be calculated by looking at the change in velocity over a period of time. The necessary computations may further delay the availability of the acceleration value. This timestamp is thus specified to represent the time at which the acceleration was "most" valid, which in this case could be the middle of the time period during which the velocity was measured.

Other types of additional information related to an attribute value can include history information (e.g., frequency of past use and past popularity information), an indication of the supplier of the attribute, indications of equivalent attributes (e.g., for mediation purposes or if a value for this attribute is not available at a later time), indications of clients that have registered for this attribute or consumed values for the attribute, descriptions of clients in order to track statistics, information to be used to evaluate characterization module efficiency and/or to facilitate process optimization, and indication of a verification of accuracy (e.g., from a third-party, or of the value generation technique that was used), a consumer rating or reputation based on input from other clients (e.g., efficiency or reliability), a cost to use the value (e.g., an actual price, or an amount of time needed to retrieve or process the value), future availability of the attribute value (e.g., how intermittent additional values may be), a version of the attribute, etc.

The subroutine illustrated in FIG. 23 begins in step 2305 where additional information about an attribute value is received. The subroutine continues to step 2310 to determine if a timestamp is received, and if so continues to step 2315 to associate the timestamp information with the received value. After step 2315, or if it was instead determined that a timestamp is not received, the subroutine continues to step 2320 to determine if uncertainty or other accuracy information is received, and if so continues to step 2325 to associate that information with the received value. After step 2325, or if it was instead determined that uncertainty or other accuracy information is not received, the subroutine continues to step 2330 to determine if accuracy decay information (e.g., the rate at which the accuracy of the value changes over time) is received, and if so continues to step 2335 to associate that information with the received value. After step 2335, or if it was instead determined that accuracy decay information is not received, the subroutine continues to step 2340 to determine if information indicating that the value is a constant is received, and if so continues to step 2345 to associate that information with the received value. After step 2345, or if it was instead determined that constant-related information is not received, the subroutine continues to step 2350 to determine if information about which clients are to have access to the supplied value is received, and if so continues to step 2355 to associate that information with the received value so that client access to the attribute value is so restricted. After step 2355, or if it was instead determined that client access information is not received, the subroutine continues to step 2360 to associate any other received additional information with the received value, and then continues to step 2360 and returns. Those skilled in the art will appreciate that the various types of additional information can be associated with the received value in a variety of ways, such as by using a data structure to represent a received value that includes elements for the various types of associated information.

Figure 24:
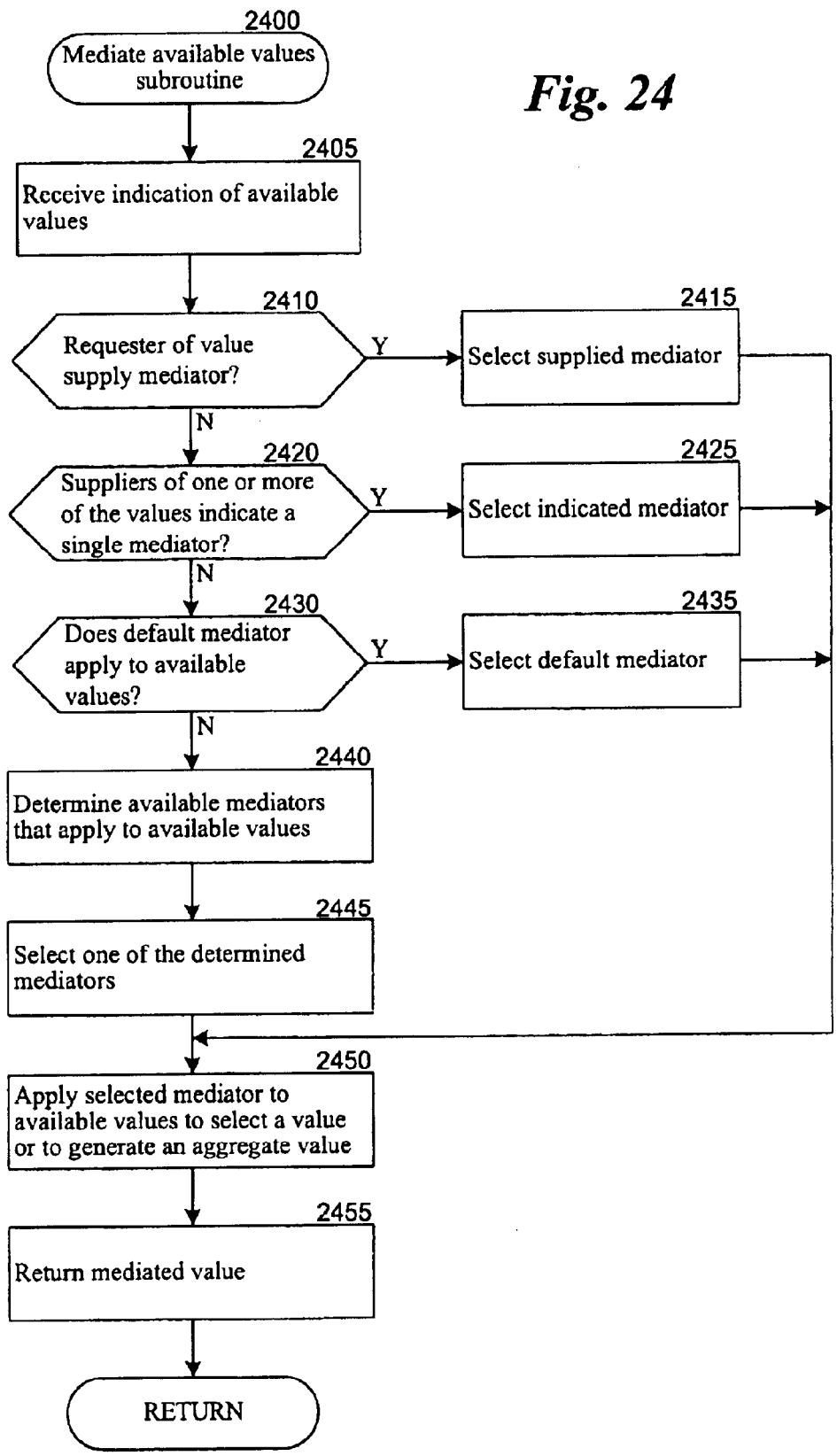
FIG. 24 is a flow diagram of an embodiment of the Mediate Available Values subroutine.

FIG. 24 is a flow diagram of an embodiment of the Mediate Available Values subroutine 2400, as illustrated in the accompanying figure and described elsewhere. As illustrated and discussed elsewhere, a variety of different types of mediators can be defined and specified. For example, some mediators include the following.

| Mediator Name | Description |
| --- | --- |
| First | The first attribute instance that was created. |
| Last | The last attribute instance that was created. |
| Fast | The first attribute instance to respond to a request for evaluation. |
| Confidence | The attribute instance with the lowest uncertainty. |
| Freshness | The attribute instance with the newest data value. |
| Average | The attribute instances are averaged and the result returned. |
| Vote | Two or more attributes that agree overrule ones that do not. |
| User Choice | The user is presented with a choice of which instance to use. |
| Fast Decay | The instances' confidence is attenuated quickly over time based upon the age of the data. The attenuated confidence is used to select the instance. |
| Slow Decay | The instances' confidence is attenuated slowly over time based upon the age of the data. The attenuated confidence is used to select the instance. |

Those skilled in the art will appreciate that a variety of other mediators could similarly be used, including using the previously used value or a default value. In addition, other techniques could also be used, such as indicating that no value is available, asking a user to choose between available values or to provide additional instructions, repeatedly trying to obtain an appropriate value, attempt to identify new possible sources or a new mediation mechanism or technique, etc.

The subroutine begins at step 2405 where an indication of the values available for the mediation are received. The subroutine then continues to step 2410 to determine if a requester of the mediated value indicated a mediator to be used, and if so continues to step 2415 to select that mediator. If it is instead determined that the requester did not indicate a mediator to be used, the subroutine continues to step 2420 to determine if a supplier of one or more of values being mediated indicated a mediator to be used, and if so continues to step 2425 to select that mediator. If it is instead determined that a supplier did not indicate a mediator to be used, the subroutine continues to step 2430 to determine if a default mediator is available, and if so continues to step 2435 to select that mediator. If it is instead determined that a default mediator is not available, the subroutine continues to step 2440 to determine the mediators that are available to be used and then in step 2445 selects one of the available mediators. After steps 2415, 2425, 2435 or 2445, the subroutine continues to step 2450 to apply the selected mediator to the available values in order to select one or the available values or to generate a related value based on the available values. The subroutine then continues to step 2455 to return the mediated value, and returns. Those skilled in the art will appreciate that in other embodiments mediators could be identified and/or obtained in other manners, such as by being specified by third-parties that are not acting as a client, server, or characterization module.

Figure 25:
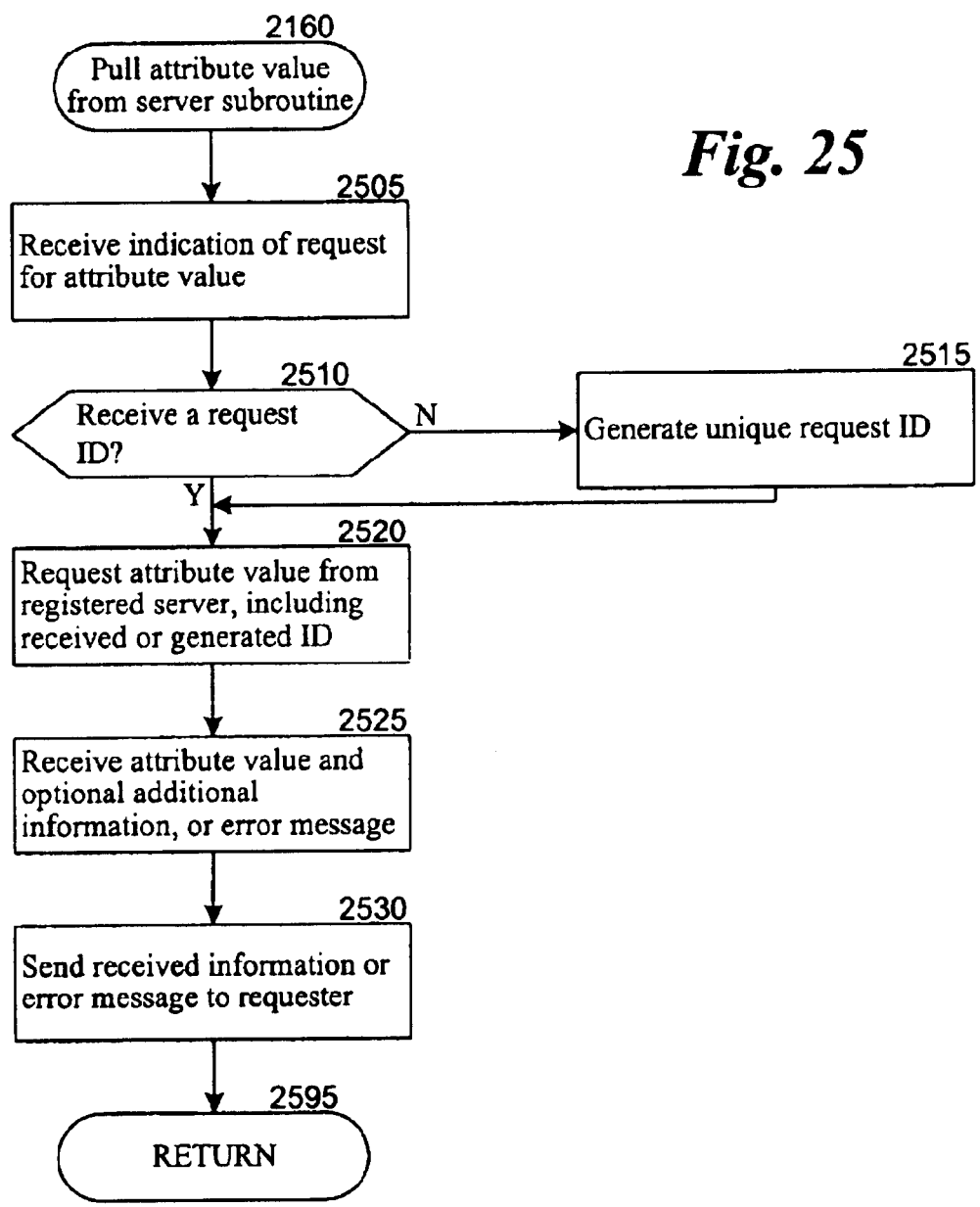
FIG. 25 is a flow diagram of an embodiment of the Pull Attribute Value From Server subroutine.

FIG. 25 is a flow diagram of an embodiment of the Pull Attribute Value From Server subroutine 2160, as illustrated in the accompanying figure and described elsewhere. In particular, the subroutine begins in step 2505 where an indication of a request for an attribute instance value is received. The subroutine then continues to step 2510 to determine if an ID for the request has been received. If not, the subroutine continues to step 2515 to generate a unique request ID. After step 2515, or if it was instead determined that an ID for the request has been received, the subroutine continues to step 2520 to request an attribute value from the server registered for the attribute instance, including the unique ID with the request. The unique ID is included so that any circular references during the requests can be detected, as explained in greater detail below. The subroutine next continues to step 2525 to receive in response an attribute value and optionally additional information, or to instead receive an error message. In step 2530, the received information or error message is sent to the requester of the value, and in step 2595 the subroutine returns.

Figure 26:
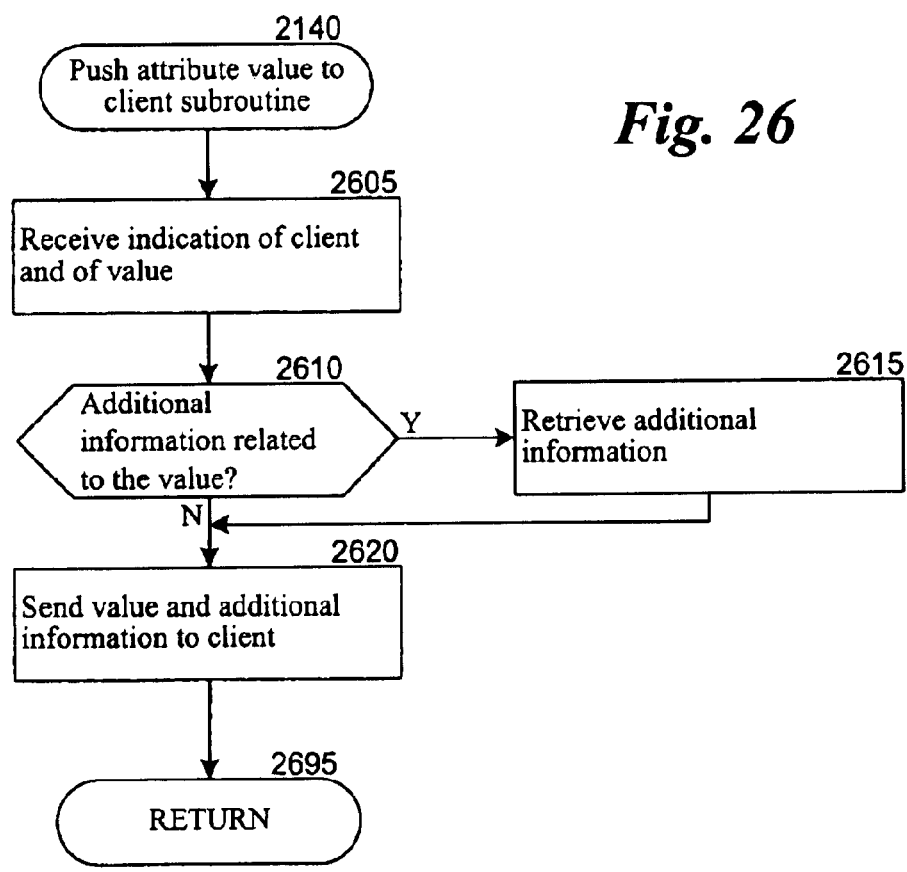
FIG. 26 is a flow diagram of an embodiment of the Push Attribute Value To Client subroutine.

FIG. 26 is a flow diagram of an embodiment of the Push Attribute Value To Client subroutine 2140, as illustrated in the accompanying figure and described elsewhere. In particular, in the first step the subroutine receives an indication of an attribute instance value and of a client to receive that value. The subroutine then continues to the second step to determine if additional information is associated with the indicated value, and if so retrieves that additional information. After retrieving the additional information, or if it was instead determined that there is no associated additional information, the subroutine next sends the value and any available additional information to the indicated client. The subroutine then returns.

Figure 27:
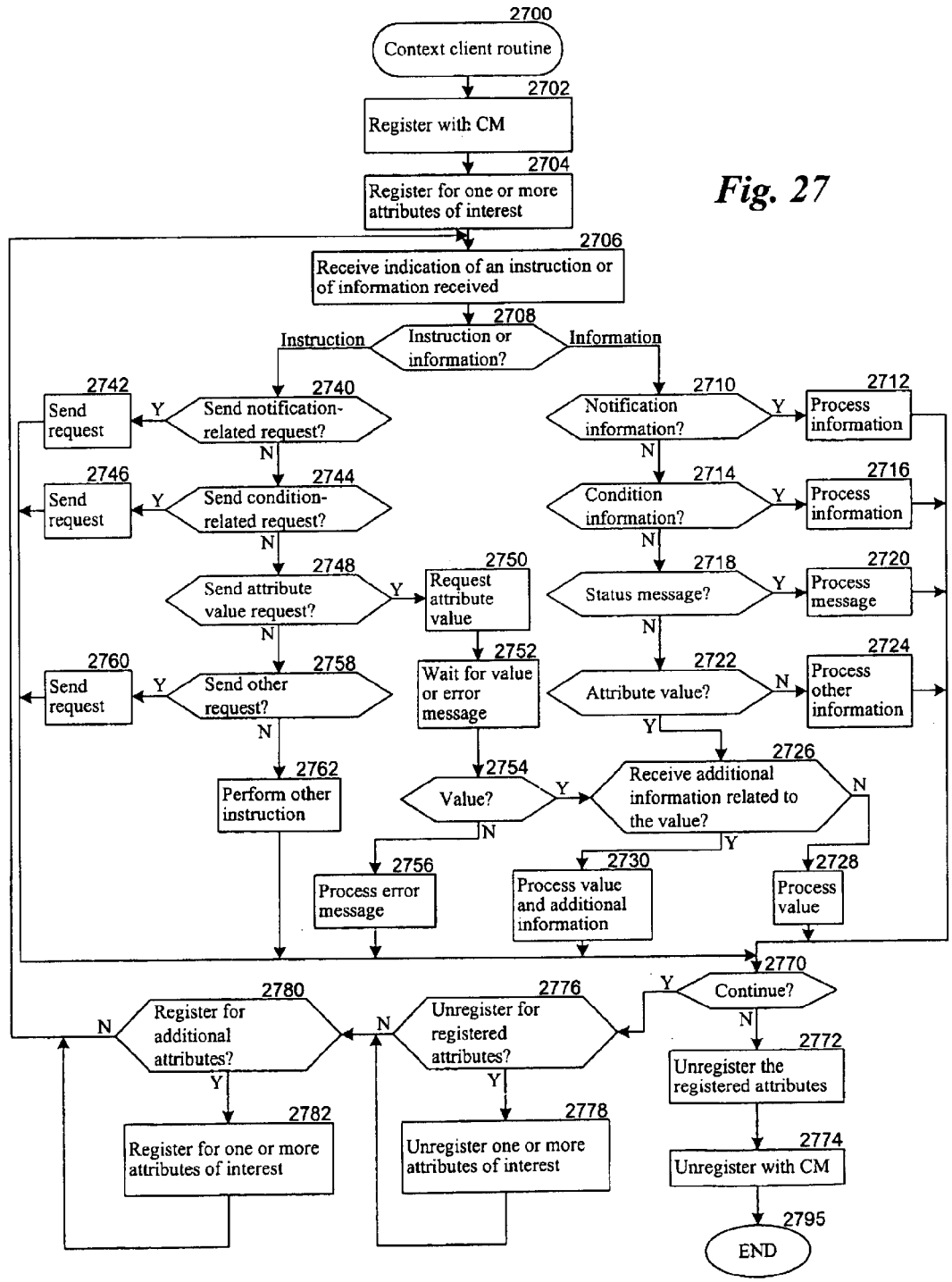
FIG. 27 is a flow diagram of an embodiment of the Context Client routine.

FIG. 27 is a flow diagram of an embodiment of the Context Client routine 2700. The routine receives messages from the CM as well as instructions from users, sends messages to the CM, and processes received messages and instructions. In some embodiments, a CC could indicate to the CM an interest in receiving values for one or more attributes, but not begin to otherwise execute (e.g., by dynamically loading code) until a value for one of the attributes is supplied by the CM. The routine begins in step 2702 where the CC registers with the CM. The routine then continues to step 2704 where the CC optionally registers for one or more attributes of interest with the CM. The routine continues to step 2706 where it receives an indication of an instruction or of information received. The routine continues to step 2708 where it determines whether information or an instruction has been received.

If information has been received, the routine continues to step 2710 to determine if information about the satisfaction of a notification request has been received, and if so continues to step 2712 to process the notification satisfaction information and to take appropriate action. If notification information has not been received, the routine continues to step 2714 to determine if information about the satisfaction of a condition has been received, and if so continues to step 2716 to process the condition satisfaction information and to take appropriate action. If condition information has not been received, the routine continues to step 2718 to determine if a status message from the CM has been received (e.g., that a particular CS or a particular attribute has been unregistered), and if so continues to step 2720 to process the status information and to take appropriate action. If a status message has not been received, the routine continues to step 2722 to determine if an attribute value has been pushed to the CC. If not, the routine continues to step 2724 to process the other information that has been received, and if so continues to step 2726 to determine if additional information related to the value has also been received. If additional information has been received, the subroutine continues to step 2730 to process the value and the additional information, and if not the routine continues to step 2728 to process the value.

If it was instead determined in step 2708 that an instruction was received, the routine continues to step 2740 to determine if the instruction is to send a notification-related request (e.g., to establish a request) to the CM, and if so the routine continues to step 2742 to send the request. If the instruction is not to send a notification-related request, the routine continues to step 2744 to determine if the instruction is to send a condition-related request (e.g, to temporarily suspend an existing condition), and if so the routine continues to step 2746 to send the request to the CM. If a condition-related request was not received, the routine continues to step 2748 to determine if an instruction to send an attribute value request was received, and if so continues to step 2750 to request the attribute value from the CM. In addition, other information could also be specified with the request, such as a mediator to be used if there are multiple available values or an indication of a particular supplier from whom to receive the value. After step 2750, the routine then continues to step 2752 to wait for the requested value or an error message. If it is determined in step 2754 that a value was received, the routine continues to step 2726, and if not the routine continues to step 2756 to process the error message.

If it was instead determined in step 2748 that the instruction was not to send an attribute value request, the routine continues to step 2758 to determine if the instrument was to send another type of request. If so, the routine continues to step 2760 to send the request, and if not the routine continues to step 2762 to perform another instruction as indicated. A variety of other types of requests could be sent to the CM, such as to shutdown the CM or a CS, to launch a CS, to specify a default mediator for the CM, etc. After steps 2712, 2716, 2720, 2724, 2728, 2730, 2742, 2746, 2756, 2760, or 2762, the routine continues to step 2770 to determine whether to continue. If not, the routine continues to step 2772 to unregister the registered attributes for the CC, next to step 2774 to unregister the client with the CM, and then to step 2795 to end. If it is instead determined to continue, the routine continues to step 2776 to determine whether any currently registered attributes should be unregistered, and if so continues to step 2778 to unregister the attributes with the CM. After step 2778, or if it was determined not to unregister any attributes, the routine continues to step 2780 to determine whether to register any additional attributes. If so, the routine continues to step 2782 to register for one or more attributes of interest. After step 2782, or if it was determined not to register any additional attributes, the routine returns to step 2706.

Figure 28:
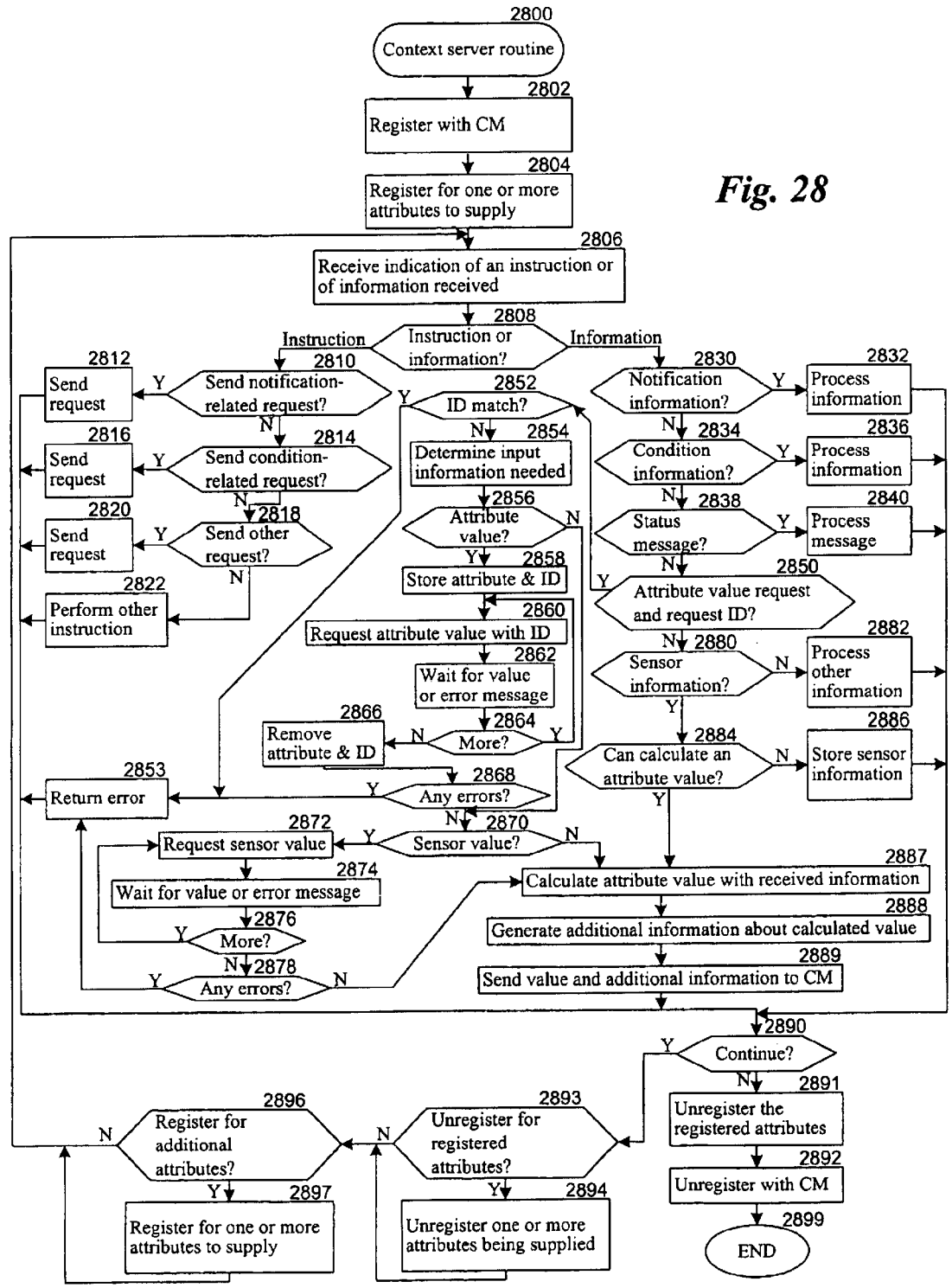
FIG. 28 is a flow diagram of an embodiment of the Context Server routine.

FIG. 28 is a flow diagram of an embodiment of the Context Server routine 2800. The routine receives messages from the CM as well as instructions from users, sends messages to the CM, and processes received messages and instructions. In some embodiments, a CS could indicate to the CM an ability to supply values for one or more attributes, but not begin to otherwise execute (e.g., by dynamically loading code) until a value is requested. The routine begins in step 2802 where the CS registers with the CM. The routine then continues to step 2804 where it registers with the CM for one or more attributes for which the CS has the ability to supply values. The routine continues to step 2806 where it receives an indication of an instruction or of information received. The routine continues to step 2808 where it determines whether information or an instruction has been received.

If an instruction was received, the routine continues to step 2810 to determine if the instruction is to send a notification-related request (e.g., to establish a request) to the CM, and if so the routine continues to step 2812 to send the request. If the instruction is not to send a notification-related request, the routine continues to step 2814 to determine if the instruction is to send a condition-related request (e.g., to temporarily suspend an existing condition), and if so the routine continues to step 2816 to send a request to the CM. If a condition-related request was not received, the routine continues to step 2818 to determine if the instruction was to send another type of request. If so, the routine continues to step 2820 to send the request, and if not the routine continues to step 2822 to perform another instruction as indicated.

If it was instead determined in step 2808 that information has been received, the routine continues to step 2830 to determine if information about the satisfaction of a notification request has been received, and if so continues to step 2832 to process the notification information and to take appropriate action. If notification information has not been received, the routine continues to step 2834 to determine if information about the satisfaction of a condition has been received, and if so continues to step 2836 to process the condition information and to take appropriate action. If condition information has not been received, the routine continues to step 2838 to determine if a status message from the CM has been received (e.g, that a particular CC has registered), and if so continues to step 2840 to process the status information and to take appropriate action.

If a status message has not been received, the routine continues to step 2850 to determine if a pull attribute value request has been received by the CS, along with an ID that uniquely identifies the request. The unique ID in this example embodiment is used to allow the context server to determine if a circular reference exists when determining the requested attribute value. For example, consider the situation in which CS 1 is registered to supply values for attribute 1, and CS 2 is registered to supply values for attribute 2. In addition, imagine that the calculation of the value for attribute 1 depends on the value for attribute 2. Thus, when CS 1 receives a pull request to supply the value for attribute 1, it requests the value for attribute 2 from the CM, which in turn request the value from CS 2. After receiving the value for attribute 2 from CS 2 via the CM, CS 1 can then calculate the value for attribute 1 and satisfy the initial request by supplying the value to the CM. If, however, CS 2 also depends on the value for attribute 1 in order to calculate the value for attribute 2, a circular reference may exist. In that situation, after CS 1 requests the value of the attribute 2 in order to calculate the value for attribute 1, CS 2 may in turn request the value of attribute 1 from CS 1 (via the CM), thus creating a loop such that neither attribute value can be calculated. In order to detect such circular references, the example routine uses a unique ID passed along with attribute value requests. Alternate equivalent ways of identifying circular references could instead be used, or no such processing could be performed.

In the illustrated embodiment, if it is determined that a pull attribute value request has been received by the CS, the routine continues to step 2852 to determine if the received request ID matches a temporarily stored ID for the same attribute value. If so, a circular reference exists, and the routine continues to step 2853 to return an error message. If the ID does not match, the routine continues to step 2854 to determine the input information needed (if any) to calculate the requested value. The routine then continues to step 2856 to determine if the value of another attribute is needed. If so, the routine in step 2858 temporarily stores an indication of the attribute whose value is being calculated and of the ID. The routine then continues to step 2860 to request the attribute value needed, including the received ID. In step 2862, the routine waits for the requested value or error message. After receiving the value or error message, the routine continues to step 2864 to determine if more attribute values are needed, and if so to return to step 2860. After all of the needed attribute values have been received, the routine continues to step 2866 to remove the temporarily stored attribute value and ID, and then continues to step 2868 to determine if any errors were received for needed attribute values such that sufficient information to calculate the value requested of the CS is not available. If so, the routine continues to step 2853 to signal an error.

If there are no such errors, or if it was instead determined in step 2856 that no attribute values were needed, the routine continues to step 2870 to determine if any sensor values or other input information is needed to calculate the value requested of the CS. If so, the routine continues in steps 2872 through 2876 to request and receive the sensor or other input information that is needed. The routine then continues to step 2878 to determine if any errors were received for needed sensor values or other input information such that sufficient information to calculate the value request of the CS is not available. If so, the routine continues to step 2853. If no such errors occurred, or if it was instead determined in step 2870 that no sensor or other input information was needed, the routine continues to step 2887 to calculate the requested attribute value based on the received information. The routine then continues to step 2888 to optionally calculate additional information about the value that characterizes it (e.g., a timestamp or uncertainty information), and then continues to step 2889 to send the value and any additional information to the CM to satisfy the request.

If it was instead determined in step 2850 that an attribute value request was not received, the routine continues to step 2880 to determine if sensor or other input information has been pushed to the CS. If not, the routine continues to step 2882 to process the other information received, and if so continues to step 2884 to determine if the CS has sufficient information to calculate one or more attribute values based on the received input information and other stored information. If so, the routine continues to step 2887 to calculate those values and to push them to the CM, and if not the routine continues to step 2886 to store the sensor information for later use. In alternate embodiments, the CS could request other information that is needed to calculate an attribute value when sensor or other input information is received, rather than waiting until all necessary information has been received.

After steps 2812, 2816, 2820, 2822, 2832, 2836, 2840, 2853, 2882, 2886 or 2889, the routine continues to step 2890 to determine whether to continue. If not, the routine continues to step 2891 to unregister the registered attributes for the CS, next to step 2892 to unregister the server with the CM, and then to step 2899 to end. If it was instead determined to continue, the routine continues to step 2893 to determine whether any currently registered attributes should be unregistered, and if so continues to step 2894 to unregister the attributes with the CM. After step 2894, or if it was determined not to unregister any attributes, the routine continues to step 2896 to determine whether to register any additional attributes. If so, the routine continues to step 2897 to register for one or more attributes of interest. After step 2897, or if it was determined not to register any additional attributes, the routine returns to step 2806.

As discussed previously, a variety of error messages can be used by the CS, CM, and CC. Example error messages include the following.

Attribute already exists—Occurs when a CS attempts to create an attribute instance that already exists.

Attribute does not exist—Occurs when the CM receives a request for an attribute that does not exist.

Attribute instance does not exist—Occurs when the CM receives a request for a specific instance of an attribute which is not registered.

Attribute mediator does not exist—Occurs when a request for an attribute mediator could not be fulfilled because the name does not correspond to an existing attribute mediator.

Attribute unavailable—Occurs when a CS determines that it cannot satisfy a request for reasons other than when an attribute upon which it depends returns an error.

CS already running—A request to launch a CS could not be completed because the CS was already running.

CS does not exist—A request has been made for a CS that has not registered.

CS not found—A request to launch a CS could not be completed because the CS was not found.

CS unavailable—A request was made to a CS that cannot respond.

Condition already exists—Occurs when a client attempts to create a condition with a name that is already in use.

Condition does not exist—A request has been made for a non-existent condition.

Event already exists—Occurs when a client attempts to create an event with a name that is already in use.

Event does not exist—A request has been made for a non-existent event.

Inconsistent attribute data type—Occurs when a CS registers or provides an attribute instance for an attribute that already exists that has a different data type.

Request timed out—Occurs when the timeout has been exceeded and the request cannot be satisfied.

When error messages are received in some embodiments, the module receiving the error may make the request again but specify that diagnostic information is to be received, thus assisting in identifying the source of the error.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to purse such additional claim forms for other aspects of the invention.

We claim:

1. A method in a wearable computer for providing information about a current state of a user of the wearable computer, the current state modeled with multiple state attributes, the wearable computer executing a plurality of state server modules to supply values for the state attributes, executing a plurality of state client modules to receive and process values for the state attributes, and executing an intermediary module to facilitate exchange of state attribute values, the method comprising:

under control of each of the state server modules, sending to the intermediary module a registration message indicating a current availability of the state server module to supply values for an indicated one of the state attributes;

under control of the intermediary module,
receiving the sent registration messages; and
for each of multiple state client modules,
receiving from the state client module a request for a current value of a specified state attribute;
requesting a value for the specified state attribute from at least one state server module that is determined to be currently available to supply values for the specified state attribute, the determining based on the received registration messages;
receiving from at least one of the determined state server modules the requested value and additional descriptive information related to usage of the requested value, the additional information indicating an accuracy of the requested value and a time at which the requested value has the indicated accuracy; and
sending to the state client module one of the received values and the received additional descriptive information related to the one value; and under control of each of the multiple state client modules,
receiving from the intermediary module a requested value and additional descriptive information; and
processing the received requested value based on the received additional descriptive information.

2. The method of claim 1 wherein the intermediary module stores values and additional descriptive information for the state attributes that are received from the state server modules, and wherein the requesting of the determined state server modules to supply a requested value of a specified state attribute to be sent to a state client module occurs only if an appropriate value for the specified state attribute is not stored by the intermediary module, the appropriateness of a stored value based at least in part on the stored additional descriptive information related to the stored value.

3. The method of claim 1 including, under the control of each of the determined state server modules:

receiving the request from the intermediary module to supply the requested value;

determining at least one input sensor able to supply input information related to the requested value; and in response to the receiving of the request,
obtaining the related input information from the determined input sensors;
generating the requested value based on the obtained information;
determining additional descriptive information related to the generated value; and
sending to the intermediary module the generated value and the determined additional descriptive information.

4. The method of claim 1 wherein the received request from the state client module for the current value of the specified state attribute includes an indication of an accuracy threshold for the current value, and including:
after the receiving of the requested values and the additional descriptive information from the determined state server modules, selecting one of the received values to be sent to the client module based on the accuracy of the selected value being above the indicated accuracy threshold, the accuracy of the selected value being indicated by the received additional descriptive information related to the selected value.

5. The method of claim 1 wherein the processing of the received requested value includes presenting information to a user of the state client module based on the received requested value.

6. The method of claim 1 wherein at least some of the state client modules send requests to the intermediary module for values of additional state attributes of a current state other than for the user, and wherein the intermediary module sends values for the additional state attributes to those state client modules, the values for the additional state attributes received from state server modules in response to requests from the intermediary module for the values.

7. A method in a computer for providing information about a current state that is modeled with multiple state attributes, comprising:
receiving from a first source an indication of an ability to supply values for an indicated one of the state attributes of the modeled current state;
receiving from a second source an indication of an ability to supply values for another of the state attributes of the modeled current state;
after receiving an indication of the indicated attribute from a first client,
determining that the first source is available to supply a value for the indicated attribute;
obtaining from the first source an indication of the value and information describing the indicated value, the descriptive information indicating a time at which the indicated value was generated;
storing the indicated value;
determining based at least in part on the descriptive information whether the indicated value is appropriate to be supplied to the client; and
when it is determined that the indicated value is appropriate, supplying the indicated value to the client; and
in response to receiving requests from clients for a value of the indicated state attribute, supplying the stored value to the clients while a difference from a current time to the time at which the stored value was generated is less than a threshold.

8. The method of claim 7 wherein the descriptive information indicates that the indicated value is a constant value for the indicated state attribute.

9. The method of claim 8 including:
storing the obtained constant value; and
supplying the stored constant value to clients in response to future requests for a value of the indicated state attribute.

10. The method of claim 7 wherein the descriptive information indicates a name of the indicated attribute.

11. The method of claim 10 wherein the indicated attribute is part of a predefined taxonomy of attributes such that each of the attributes in the predefined taxonomy has a predefined name.

12. The method of claim 10 wherein the indicated attribute is dynamically defined by the first source, and wherein the descriptive information provides an indication of an applicability of the indicated value so as to assist clients in determining whether to use the indicated value.

13. The method of claim 7 wherein the obtaining of the value includes requesting the first source to supply a value, the requesting including an indication of a time period, and wherein the indicated value is determined to be appropriate if the time period includes the time at which the indicated value was generated.

14. The method of claim 7 wherein the descriptive information indicates a time at which the indicated value is most accurate.

15. The method of claim 14 wherein the obtaining of the value includes requesting the first source to supply a value, the requesting including an indication of a time period, and wherein the indicated value is determined to be appropriate if the time period includes the time at which the indicated value is most accurate.

16. The method of claim 7 wherein the descriptive information includes a likelihood of accuracy of the indicated value.

17. The method of claim 16 wherein the obtaining of the value includes requesting the first source to supply a value, the requesting including an indication of a minimum accuracy, and wherein the indicated value is determined to be appropriate if the likelihood of accuracy is at least the minimum accuracy.

18. The method of claim 7 wherein the descriptive information indicates a precision of the indicated value.

19. The method of claim 7 wherein the descriptive information indicates properties of the indicated value.

20. The method of claim 7 wherein the descriptive information indicates a group of at least one authorized client, and wherein the indicated value is determined to be appropriate for the client if the client is one of the authorized clients.

21. The method of claim 7 wherein the descriptive information indicates a version of the first source.

22. The method of claim 7 wherein the descriptive information indicates how the indicated value was generated.

23. The method of claim 7 wherein the descriptive information indicates how the indicated value is to be interpreted.

24. The method of claim 7 wherein the received indication from the first client is a request for a value of the indicated attribute, and wherein the obtaining of the value from the first source includes requesting the first source to supply the value, the requesting in response to the receiving of the request from the first client.

25. The method of claim 7 wherein the determining of whether the indicated value is appropriate includes determining whether the obtained descriptive information satisfies a specified criteria.

26. The method of claim 7 wherein the indicated attribute represents information about a user of the computer.

27. The method of claim 26 wherein the represented information reflects a modeled mental state of the user.

28. The method of claim 7 wherein the indicated attribute represents information about the computer.

29. The method of claim 7 wherein the indicated attribute represents information about a physical environment.

30. The method of claim 7 wherein the indicated attribute represents information about a cyber-environment of a user of the computer.

31. The method of claim 7 wherein the indicated attribute represents a current prediction about a future state.

32. The method of claim 7 wherein multiple sources have an ability to supply values for the indicated attribute, and including requesting each of the multiple sources to supply a value of the indicated attribute after the receiving of the indication from the first client.

33. The method of claim 32 including receiving multiple values for the indicated attribute and receiving descriptive information for each of the multiple values, and wherein the obtaining of the value includes selecting one of the multiple values based on the received descriptive information for the one value.

34. The method of claim 7 including, after receiving an indication from the first client for a value of a second indicated attribute and after receiving from a source a value for the second attribute, supplying to the first client the received value for the second attribute.

35. The method of claim 34 wherein the received value for the second attribute is from the first source.

36. The method of claim 7 including, after obtaining from a source a second value for the indicated attribute and descriptive information for the second value, supplying the second value to the first client.

37. The method of claim 7 including supplying to the first client a mediated value for the indicated attribute that is based on multiple received values for the indicated attribute, the mediating based on descriptive information received for each of the multiple received values.

38. The method of claim 7 wherein receiving of the supplied value by the first client prompts the first client to present information to a user of the first client.

39. A method in a computer for providing information about a current state that is modeled with multiple state attributes, comprising:
   receiving from a first source an indication of an ability to supply values for an indicated one of the state attributes of the modeled current state;
   receiving from a second source an indication of an ability to supply values for another of the state attributes of the modeled current state;
   after receiving an indication of the indicated attribute from a first client,
      determining that the first source is available to supply a value for the indicated attribute;
      obtaining from the first source an indication of the value and information describing the indicated value, the descriptive information indicating a time at which the indicated value is most accurate;
      storing the indicated value;
      determining based at least in part on the descriptive information whether the indicated value is appropriate to be supplied to the client; and
      when it is determined that the indicated value is appropriate, supplying the indicated value to the client; and
   in response to receiving requests from clients for a value of the indicated state attribute, supplying the stored value to the clients while a difference from a current time to the time at which the stored value is most accurate is less than a threshold.

40. A method in a computer for providing information about a current state that is modeled with multiple state attributes, comprising:
   receiving from a first source an indication of an ability to supply values for an indicated one of the state attributes of the modeled current state;
   receiving from a second source an indication of an ability to supply values for another of the state attributes of the modeled current state;
   after receiving an indication of the indicated attribute from a first client,
      determining that the first source is available to supply a value for the indicated attribute;
      obtaining from the first source an indication of the value and information describing the indicated value, the descriptive information including a likelihood of accuracy of the indicated value that decays over time;
      storing the indicated value;
      determining based at least in part on the descriptive information whether the indicated value is appropriate to be supplied to the client; and
      when it is determined that the indicated value is appropriate, supplying the indicated value to the client; and
   in response to receiving requests from clients for a value of the indicated state attribute, supplying the stored value to the clients if a current decayed likelihood of accuracy of the stored value satisfies an accuracy threshold.

41. A method in a computer for providing information about a current state that is modeled with multiple state attributes, comprising:
   receiving from a first source an indication of an ability to supply values for an indicated one of the state attributes of the modeled current state;
   receiving from a second source an indication of an ability to supply values for another of the state attributes of the modeled current state; and
   after receiving an indication of the indicated attribute from a first client,
      determining that the first source is available to supply a value for the indicated attribute;
      obtaining from the first source an indication of the value and information describing the indicated value, the descriptive information indicating an uncertainty of the indicated value;
      determining based at least in part on the descriptive information whether the indicated value is appropriate to be supplied to the client; and
      when it is determined that the indicated value is appropriate, supplying the indicated value to the client.

42. The method of claim 41 wherein the obtaining of the value includes requesting the first source to supply a value, the requesting including an indication of a maximum uncertainty, and wherein the indicated value is determined to be appropriate if the uncertainty is less than the maximum uncertainty.

43. A method in a computer for providing information about a current state that is modeled with multiple state attributes, comprising:
   receiving from a first source an indication of an ability to supply values for an indicated one of the state attributes of the modeled current state;

receiving from a second source an indication of an ability to supply values for another of the state attributes of the modeled current state;

after receiving an indication of the indicated attribute from a first client,
  determining that the first source is available to supply a value for the indicated attribute;
  obtaining from the first source an indication of the value and information describing the indicated value;
  determining based at least in part on the descriptive information whether the indicated value is appropriate to be supplied to the client; and
  when it is determined that the indicated value is appropriate, supplying the indicated value to the client;

receiving from a source without request a current value of a specified state attribute and descriptive information for the current value; and in response to the receiving of the current value,
  determining at least one client having an interest in receiving the received current value for the specified state attribute, the determining based at least in part of the received descriptive information; and
  sending the received current value to each of the determined clients.

44. A method in a computer for providing information about a current state that is modeled with multiple state attributes, comprising:
  receiving from a first source an indication of an ability to supply values for an indicated one of the state attributes of the modeled current state;
  receiving from a second source an indication of an ability to supply values for another of the state attributes of the modeled current state;
  after receiving an indication of the indicated attribute from a first client,
    determining that the first source is available to supply a value for the indicated attribute;
    obtaining from the first source an indication of the value and information describing the indicated value;
    determining based at least in part on the descriptive information whether the indicated value is appropriate to be supplied to the client; and
    when it is determined that the indicated value is appropriate, supplying the indicated value to the client; and
  after obtaining from a source a second value for the indicated attribute and descriptive information for the second value, supplying the second value to the first client, the second value distinct from the indicated value, and the descriptive information for the second value the same as the descriptive information for the indicated value.

45. A method in a computer for providing information about a current state that is modeled with multiple state attributes, comprising:
  receiving from a first source an indication of an ability to supply values for an indicated one of the state attributes of the modeled current state;
  receiving from a second source an indication of an ability to supply values for another of the state attributes of the modeled current state; and
  after receiving an indication of the indicated attribute from a first client,
    determining that the first source is available to supply a value for the indicated attribute;
    obtaining from the first source an indication of the value and information describing the indicated value;
    determining based at least in part on the descriptive information whether the indicated value is appropriate to be supplied to the client; and
    when it is determined that the indicated value is appropriate, supplying the indicated value to the client; and
  after obtaining from a source a second value for the indicated attribute and descriptive information for the second value, supplying the second value to the first client, the second value the same as the indicated value, and the descriptive information for the second value distinct from the descriptive information for the indicated value.

46. A computer-readable medium whose contents cause a computing device to provide information about a current state that is modeled with multiple state attributes, by performing a method comprising:
  receiving from a first source an indication of an ability to supply values for an indicated one of the state attributes of the modeled current state;
  after receiving an indication of the indicated attribute from a first client,
    determining that the first source is available to supply a value for the indicated attribute;
    obtaining from the first source an indication of the value and information describing the indicated value, the descriptive information indicating a generation time for the indicated value;
    determining based at least in part on the descriptive information whether the indicated value is appropriate to be supplied to the client; and
    when it is determined that the indicated value is appropriate, supplying the indicated value to the clients;
  storing the indicated value; and
  in response to receiving requests from clients for a value of the indicated state attribute, supplying the stored value to the clients while a difference from a current time to the generation time for the stored value is less than a threshold.

47. The computer-readable medium of claim 46 wherein the computer-readable medium is a memory of the computing device.

48. A computer-readable generated data signal transmitted via a transmission medium, the generated data signal having encoded contents that cause a computer system to provide information about a current state that is modeled with multiple state attributes by performing a method comprising:
  receiving from a first source an indication of an ability to supply values for an indicated one of the state attributes of the modeled current state;
  receiving from a second source an indication of an ability to supply values for another of the state attributes of the modeled current state;
  after receiving an indication of the indicated attribute from a first client,
    determining that the first source is available to supply a value for the indicated attribute;
    obtaining from the first source an indication of the value and information describing the indicated value, the descriptive information indicating a time at which the indicated value was generated;

storing the indicated value;

determining based at least in part on the descriptive information whether the indicated value is appropriate to be supplied to the client; and when it is determined that the indicated value is appropriate, supplying the indicated value to the client; and in response to receiving requests from clients for a value of the indicated state attribute, supplying the stored value to the clients while a difference from a current time to the time at which the stored value was generated is less than a threshold.

49. A computing device for providing information about a current state that is represented with multiple attributes, comprising:

an attribute mapping module that is capable of receiving from a first source an indication of an ability to supply values for an indicated one of the attributes of the current state and of receiving from a second source an indication of an ability to supply values for another of the attributes of the current state;

an attribute value request module that is capable of receiving an indication from a first client of the indicated attribute; and an attribute value supplier module that is capable of, after the receiving of the indication from the first client, requesting the first source to supply a value of the indicated attribute, receiving from the first source an indication of the requested value and descriptive information for the received value that indicates a time at which the received value was generated, determining based on the received descriptive information whether the received requested value is appropriate to be supplied to the client, supplying the received value to the client when it is determined that the received requested value is appropriate, and supplying to other clients in response to received requests the received value while a difference from a current time to the time at which the received value was generated is less than a threshold.

50. The computing device of claim 49 wherein the attribute mapping module, the attribute value request module, and the attribute value supplier module are components of an intermediary module executing in memory.

51. The computing device of claim 49 further comprising multiple sources and multiple clients executing in the memory.

52. A computing device for providing information about a current state that is represented with multiple modeled attributes, comprising:

means for receiving from a first source an indication of an ability to supply values for an indicated one of the modeled attributes of the current state and for receiving from a second source an indication of an ability to supply values for another of the modeled attributes of the current state; and means for, after receiving an indication from a first client of the indicated attribute, determining that the first source is available to supply a value for the indicated attribute, obtaining from the first source an indication of the value and information describing the indicated value that indicates a time at which the indicated value was generated, determining based on the obtained descriptive information whether the indicated value is appropriate to be supplied to the client, and supplying the indicated value to the client when it is determined that the indicated value is appropriate, and for supplying to other clients in response to received requests the indicated value while a difference from a current time to the time at which the indicated value was generated is less than a threshold.

53. A method in a portable computer for providing information about a context that is modeled with multiple context attributes, comprising:

receiving from each of multiple sources an indication of an ability to supply values for at least one of the context attributes of the modeled context;

receiving from each of multiple clients an indication of a desire to receive multiple values for one of the context attributes of the modeled context;

for each of the multiple clients, receiving multiple requests from the client for a value for the one context attribute for which the client has indicated the desire to receive values; and after the receiving of each of the multiple requests, retrieving the requested value by, determining multiple sources currently having an ability to supply values for the one context attribute for which the client has indicated the desire to receive values;

requesting each of the determined sources to supply a value for the one context attribute;

receiving from each of multiple determined sources a value for the one context attribute and information characterizing the value based at least in part on an indicated generation time for the value;

determining at least one of the received values to send to the client based on the received information characterizing the received values; and sending the determined received values to the client; and after a received request from a client for a value of an indicated context attribute, supplying to the client a previously received value for that indicated context attribute if received information for that value indicates a generation time whose difference from a current time is less than a threshold.

54. The method of claim 53 wherein the characterizing information for each of the received values indicates a time at which that received value is most accurate.

55. The method of claim 53 wherein the characterizing information for each of the received values indicates an accuracy of that received value.

56. The method of claim 53 wherein the context attributes represent information about a user of the portable computer.

57. The method of claim 53 wherein the context that is represented is a current context.

58. The method of claim 53 wherein receiving of the sent value by the client prompts the client to present information to a user of the client.

59. A computer-readable medium containing instructions that when executed cause a computing device to provide information about a context that is modeled with multiple context attributes, by performing a method comprising:

receiving from each of multiple sources an indication of an ability to supply values for at least one of the context attributes of the modeled context;

receiving from each of multiple clients an indication of a desire to receive multiple values for one of the context attributes of the modeled context;

for each of the multiple clients, receiving multiple requests from the client for a value for the one context attribute for which the client has indicated the desire to receive values; and after the receiving of each of the multiple requests, retrieving the requested value by,
determining multiple sources currently having an ability to supply values for the one context attribute for which the client has indicated the desire to receive values;
requesting each of the determined sources to supply a value for the one context attribute;
receiving from each of multiple determined sources a value for the one context attribute and information characterizing the value by indicating a generation time for the value;
determining at least one of the received values to send to the client based on the received information characterizing the received values; and
sending the determined received values to the client; and
after a received request from a client, supplying to the client a previously received value for an indicated context attribute if received information for that value indicates a generation time whose difference from a current time is less than a threshold.

60. A portable computer for providing information about a context that is represented with multiple attributes, comprising:
an attribute mapping module that is capable of receiving from each of multiple sources an indication of an ability to supply values for at least one of the attributes of the context and of receiving from each of multiple clients an indication of a desire to receive multiple values for one of the attributes of the context; and
an attribute value supplier module that is capable of receiving from each of the multiple clients multiple requests for a value for the one attribute for which the client has indicated the desire to receive values, of determining after the receiving of each of the multiple requests whether any of the multiple sources currently have an ability to supply values for the one attribute, of requesting after the determining that each determined source supply a value for the one attribute, of receiving from each of multiple determined sources a value for the one attribute and information characterizing the value based at least in part on an indicated generation time for the value, of determining at least one of the received values to send to the client based on the received information characterizing the received values, of sending the determined received values to the requesting client, and of supplying to a client a received value for an indicated context attribute if received information for that value indicates a generation time whose difference from a current time is less than a threshold.

61. A computer-implemented method for providing information about a current state that is modeled with multiple state attributes, each of the state attributes having multiple sources available to supply values for the attribute, comprising:
sending to an intermediary module a first request for a value of a first of the state attributes;
receiving from the intermediary module a first value for the first state attribute and first information describing the first value, the first value and the first descriptive information supplied to the intermediary module from a first source, the received first descriptive information indicating that the first value was generated at an indicated time;
sending to the intermediary module a second request for a value of the first state attribute based on a current time differing from the time at which the first value was generated by more than a recency threshold;
receiving from the intermediary module a second value for the first state attribute and second information describing the second value, the second value and the second descriptive information supplied to the intermediary module from a second source;
sending to the intermediary module a third request for a value of a second of the state attributes;
receiving from the intermediary module a third value for the second state attribute and third information describing the third value, the third value and the third descriptive information supplied to the intermediary module from a third source; and
using at least one of the received values and the received descriptive information for the at least one received value to perform processing based on the modeled current state.

62. The method of claim 61 wherein the processing based on at least one of the received values includes presenting information to a user.

63. The method of claim 61 wherein the state attributes represent information about a user of the computer.

64. The method of claim 61 wherein at least one of the sent requests includes an indication of a type of descriptive information, and wherein descriptive information for a value received in response to the sent request includes information for the indicated type of descriptive information.

65. The method of claim 64 wherein the indication of the type of descriptive information includes an indication of a constraint on a value for the type of descriptive information, and wherein the received descriptive information for the received value includes a value for the indicated type of descriptive information that satisfies the constraint.

66. A computer-implemented method for providing information about a current state that is modeled with multiple state attributes, each of the state attributes having multiple sources available to supply values for the attribute, comprising:
sending to an intermediary module a first request for a value of a first of the state attributes;
receiving from the intermediary module a first value for the first state attribute and first information describing the first value, the first value and the first descriptive information supplied to the intermediary module from a first source;
sending to the intermediary module a second request for a value of the first state attribute;
receiving from the intermediary module a second value for the first state attribute and second information describing the second value, the second value and the second descriptive information supplied to the intermediary module from a second source;
sending to the intermediary module a third request for a value of a second of the state attributes;
receiving from the intermediary module a third value for the second state attribute and third information describing the third value, the third value and the third descriptive information supplied to the intermediary module from a third source, the received third descriptive information indicating that the third value is most accurate at an indicated time; and
using at least one of the received values and the received descriptive information for the at least one received value to perform processing based on the modeled current state, the using including suspending use of the third value after a current time differs from the time at which the third value is most accurate by more than a recency threshold.

67. A computer-implemented method for providing information about a current state that is modeled with multiple state attributes, each of the state attributes having multiple sources available to supply values for the attribute, comprising:

sending to an intermediary module a first request for a value of a first of the state attributes;

receiving from the intermediary module a first value for the first state attribute and first information describing the first value, the first value and the first descriptive information supplied to the intermediary module from a first source, the received first descriptive information indicating an accuracy estimate for the first value;

sending to the intermediary module a second request for a value of the first state attribute, the sending based on the accuracy estimate of the first value being less than an accuracy limit;

receiving from the intermediary module a second value for the first state attribute and second information describing the second value, the second value and the second descriptive information supplied to the intermediary module from a second source;

sending to the intermediary module a third request for a value of a second of the state attributes;

receiving from the intermediary module a third value for the second state attribute and third information describing the third value, the third value and the third descriptive information supplied to the intermediary module from a third source; and using at least one of the received values and the received descriptive information for the at least one received value to perform processing based on the modeled current state.

68. A computer-implemented method for providing information about a current state that is modeled with multiple state attributes, each of the state attributes having multiple sources available to supply values for the attribute, comprising:

sending to an intermediary module a first request for a value of a first of the state attributes;

receiving from the intermediary module a first value for the first state attribute and first information describing the first value, the first value and the first descriptive information supplied to the intermediary module from a first source;

sending to the intermediary module a second request for a value of the first state attribute;

receiving from the intermediary module a second value for the first state attribute and second information describing the second value, the second value and the second descriptive information supplied to the intermediary module from a second source;

sending to the intermediary module a third request for a value of a second of the state attributes;

receiving from the intermediary module a third value for the second state attribute and third information describing the third value, the third value and the third descriptive information supplied to the intermediary module from a third source, the received third descriptive information indicating an uncertainty of the third values; and using at least one of the received values and the received descriptive information for the at least one received value to perform processing based on the modeled current state, including declining to use the third value when the uncertainty of the third value is more than an uncertainty threshold.

69. A computer-implemented method for providing information about a current state that is modeled with multiple state attributes, each of the state attributes having multiple sources available to supply values for the attribute, comprising:

sending to an intermediary module a first request for a value of a first of the state attributes;

receiving from the intermediary module a first value for the first state attribute and first information describing the first value, the first value and the first descriptive information supplied to the intermediary module from a first source;

sending to the intermediary module a second request for a value of the first state attribute;

receiving from the intermediary module a second value for the first state attribute and second information describing the second value, the second value and the second descriptive information supplied to the intermediary module from a second source;

sending to the intermediary module a third request for a value of a second of the state attributes;

receiving from the intermediary module a third value for the second state attribute and third information describing the third value, the third value and the third descriptive information supplied to the intermediary module from a third source, the received third descriptive information indicating that the third value is a constant value for the second state attribute, and using at least one of the received values and the received descriptive information for the at least one received value to perform processing based on the modeled current state, including halting additional requests for the value of the second state attribute based on the indication that the third value is a constant value.

70. A computer-readable medium whose contents cause a computing device to provide information about a current state that is modeled with multiple state attributes, each of the state attributes having multiple sources available to supply values for the attribute, by performing a method comprising:

sending to an intermediary module a first request for a value of a first of the state attributes;

receiving from the intermediary module a first value for the first state attribute and first information describing the first value, the first value and the first descriptive information supplied to the intermediary module from a first source, the received first descriptive information indicating a generation time for the first value;

sending to the intermediary module a second request for a value of the first state attribute based on a current time differing from the generation time for the first value by more than a recency threshold;

receiving from the intermediary module a second value for the first state attribute and second information describing the second value, the second value and the second descriptive information supplied to the intermediary module from a second source;

sending to the intermediary module a third request for a value of a second of the state attributes;

receiving from the intermediary module a third value for the second state attribute and third information describing the third value, the third value and the third descriptive information supplied to the intermediary module from a third source; and using at least one of the received values and the received descriptive information for the at least one received value to perform processing based on the modeled current state.

71. A computing device for providing information about a current state that is modeled with multiple state attributes, each of the state attributes having multiple sources available to supply values for the attribute, comprising:

a first module capable of sending to an intermediary module a first request for a value of a first of the state attributes, of sending to the intermediary module a second request for a value of the first state attribute based on a current time differing by more than a recency threshold from a time at which an earlier value for the first state attribute was generated, and of sending to the intermediary module a third request for a value of a second of the state attributes;

a second module capable of receiving from the intermediary module a first value for the first state attribute and first information describing the first value that indicates a time of generation for the first value, the first value and the first descriptive information supplied to the intermediary module from a first source, of receiving from the intermediary module a second value for the first state attribute and second information describing the second value, the second value and the second descriptive information supplied to the intermediary module from a second source, and of receiving from the intermediary module a third value for the second state attribute and third information describing the third value, the third value and the third descriptive information supplied to the intermediary module from a third source; and a third module capable of using at least one of the received values and the received descriptive information for the at least one received value to perform processing based on the modeled current state.

72. A computer-implemented method for providing information about a current state that is modeled with multiple state attributes, each of the state attributes having multiple sources available to supply values for the attribute, comprising:

sending to an intermediary module a registration message indicating an ability to supply values for an indicated one of the state attributes of the modeled current state; and for each of multiple requests for a value of the one state attribute, receiving the request from the intermediary module, the sending of the request by the intermediary module based on an request received by the intermediary module from a client; and in response to the receiving of the request, retrieving multiple pieces of input information about the modeled current state, generating a value for the one state attribute based at least in part on the retrieved input information;

determining information that describes that generated value, the determined descriptive information including an uncertainty value associated with generation of the generated value; and sending to the intermediary module an indication of the generated value and of the determined descriptive information so that the intermediary module can use the descriptive information to determine whether to supply the generated value to a client and so that the client can determine how to use the generated value.

73. The method of claim 72 including:

sending to the intermediary module a registration message indicating an ability to supply values for another one of the state attributes;

generating a value for the another state attribute based at least in part on received input information about the modeled current state, determining information that describes that generated value for the another state attribute; and sending to the intermediary module an indication of the generated value for the another state attribute and of the determined descriptive information for the generated value.

74. The method of claim 72 wherein the state attributes represent information about a user of the computer.

75. The method of claim 72 wherein each of the received requests additionally indicate at least one type of descriptive information, and wherein the determined descriptive information for the generated value that is sent in response includes information for the indicated type of descriptive information.

76. The method of claim 75 wherein the indication of the type of descriptive information includes an indication of a constraint for a value for the descriptive information type, and wherein the determined descriptive information for the generated value that is sent in response includes a value for the indicated type of descriptive information that satisfies the constraint.

77. The method of claim 72 wherein the determined descriptive information includes an effective time at which the generated value is most accurate.

78. The method of claim 72 wherein the descriptive information indicates an accuracy of the generated value.

79. A computer-readable medium whose contents cause a computing device to provide information about a current state that is modeled with multiple state attributes, each of the state attributes having multiple sources available to supply values for the attribute, by performing a method comprising:

sending to an intermediary module a registration message indicating an ability to supply values for an indicated one of the state attributes of the modeled current state, and for each of multiple requests for a value of the one state attribute, receiving the request from the intermediary module, the sending of the request by the intermediary module based on an request received by the intermediary module from a client; and in response to the receiving of the request, retrieving multiple pieces of input information about the modeled current state, generating a value for the one state attribute based at least in part on the retrieved input information;

determining information that describes that generated value, the determined descriptive information including an uncertainty value associated with generation of the generated value; and sending to the intermediary module an indication of the generated value and of the determined descriptive information so that the intermediary module can use the descriptive information to determine whether to supply the generated value to a client and so that the client can determine how to use the generated value.

80. A computer system for providing information about a current state that is modeled with multiple state attributes, each of the state attributes having multiple sources available to supply values for the attribute, comprising:

a first module capable of sending to an intermediary module a registration message indicating an ability to supply values for an indicated one of the state attributes of the modeled current state; and a second module capable of, for each of multiple requests for a value of the one state attribute, receiving the request from the intermediary module, the sending of the request by the intermediary module based on an request received by the intermediary module from a client; and in response to the receiving of the request, retrieving multiple pieces of input information about the modeled current state, generating a value for the one state attribute based at least in part on the retrieved input information;

determining information that describes that generated value, the determined descriptive information including an uncertainty value associated with generation of the generated value; and sending to the intermediary module an indication of the generated value and of the determined descriptive information so that the intermediary module can use the descriptive information to determine whether to supply the generated value to a client and so that the client can determine how to use the generated value.

* * * * *

UNITED STATES PATENT AND TRADEMARK OFFICE
CERTIFICATE OF CORRECTION

PATENT NO.    : 6,812,937 B1
DATED         : November 2, 2004
INVENTOR(S)   : Kenneth H. Abbott et al.

It is certified that error appears in the above-identified patent and that said Letters Patent is hereby corrected as shown below:

Column 43,
Line 67, "values" should read as -- value --.

Signed and Sealed this

Twenty-fifth Day of October, 2005

JON W. DUDAS
*Director of the United States Patent and Trademark Office*